(12) United States Patent
Sase et al.

(10) Patent No.: US 11,440,407 B2
(45) Date of Patent: Sep. 13, 2022

(54) NON-CONTACT OPERATING APPARATUS FOR VEHICLE AND VEHICLE

(71) Applicant: SUBARU CORPORATION, Tokyo (JP)

(72) Inventors: Hideyuki Sase, Tokyo (JP); Takemi Oguri, Tokyo (JP); Tomoyuki Kitamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/751,443

(22) Filed: Jan. 24, 2020

(65) Prior Publication Data

US 2020/0307378 A1 Oct. 1, 2020

(30) Foreign Application Priority Data

Mar. 27, 2019 (JP) .............................. JP2019-060600

(51) Int. Cl.
*B60K 35/00* (2006.01)
*G06F 3/01* (2006.01)
*G06T 7/20* (2017.01)

(52) U.S. Cl.
CPC .............. *B60K 35/00* (2013.01); *G06F 3/011* (2013.01); *G06F 3/016* (2013.01); *G06T 7/20* (2013.01); *B60K 2370/11* (2019.05); *B60K 2370/146* (2019.05); *B60K 2370/152* (2019.05); *B60K 2370/21* (2019.05); *B60K 2370/31* (2019.05);
(Continued)

(58) Field of Classification Search
CPC .......... G06F 3/016; G06F 3/011; G06F 3/017;
G06F 3/0425; G06F 3/0488; G06F 3/04842; G06F 3/04815; G06F 3/04847; G06F 3/04883; G06F 2203/04108; G06T 7/20; G06T 227/30196; B60K 35/00; B60K 2370/152; B60K 2370/21; B60K 2370/11;
(Continued)

(56) References Cited

U.S. PATENT DOCUMENTS

2011/0144857 A1* 6/2011 Wingrove .............. B60K 37/06
701/31.4
2018/0039377 A1* 2/2018 Akita .................. G06K 9/00416
(Continued)

FOREIGN PATENT DOCUMENTS

JP 2017-27401 A 2/2017

*Primary Examiner* — Christopher E Leiby
(74) *Attorney, Agent, or Firm* — Troutman Pepper Hamilton Sanders LLP

(57) ABSTRACT

A non-contact operating apparatus, for a vehicle, includes a generating unit, a projecting device, an operation detecting device, an operation determining unit, and a motion detecting device. The generating unit is configured to generate and update an image containing an image object. The image object is operable by an occupant present within a vehicle compartment. The projecting device is configured to project the image in a predetermined display region. The operation detecting device is configured to detect an operation site of the occupant. The motion detecting device is configured to detect motion of the vehicle. The operation determining unit is configured to adjust a detection result of the operation detecting device to suppress the motion of the occupant on the basis of a detection result of the motion detecting device, and determine presence or absence of the operation against the image object by the operation site.

13 Claims, 10 Drawing Sheets

(52) U.S. Cl.
CPC *B60K 2370/52* (2019.05); *G06T 2207/30196* (2013.01)

(58) Field of Classification Search
CPC .......... B60K 2370/31; B60K 2370/146; B60K 2370/52
See application file for complete search history.

(56) References Cited

U.S. PATENT DOCUMENTS

| | | | |
|---|---|---|---|
| 2018/0210551 A1* | 7/2018 | Kitagawa | G06F 3/0425 |
| 2019/0005610 A1* | 1/2019 | Tillotson | G06T 3/20 |

* cited by examiner

NON-CONTACT OPERATING APPARATUS FOR VEHICLE AND VEHICLE

CROSS-REFERENCE TO RELATED APPLICATIONS

The present application claims priority from Japanese Patent Application No. 2019-060600 filed on Mar. 27, 2019, the entire contents of which are hereby incorporated by reference.

BACKGROUND

The technology relates to a non-contact operating apparatus for a vehicle and to a vehicle.

Various kinds of operating members are provided in a vehicle. For example, a start switch, a handle, a shift lever, and a pedal directed to controlling of traveling of the vehicle are provided in the vicinity of a driver's seat in the vehicle. Further, operating members for an air conditioner, a navigation apparatus, an audio device, an image receiving device, a handsfree calling device, and other equipment devices are provided in the vehicle. Thus, a large number of operating members are provided in the vehicle. The large number of operating members may be laid out on an inner surface of a vehicle compartment. In recent years, however, the inner surface for layout in the vehicle compartment tends to become insufficient. For example, in a case where it is considered that a game machine, a network communication device, an entertainment device, or any other device may be added thereto, there is a possibility that operating members for these devices cannot further be added in the future.

SUMMARY

An aspect of the technology provides a non-contact operating apparatus, for a vehicle, that includes a generating unit, a projecting device, an operation detecting device, an operation determining unit, and a motion detecting device. The generating unit is configured to generate and update an image containing an image object. The image object is operable by an occupant present within a vehicle compartment of the vehicle. The projecting device is configured to project the image in a predetermined display region within the vehicle compartment of the vehicle. The operation detecting device is configured to detect an operation site of the occupant positioned in a vicinity of the predetermined display region within the vehicle compartment. The operation determining unit is configured to determine, on the basis of a position or motion of the operation site of the occupant with respect to the image object, whether the operation site of the occupant detected by the operation detecting device performs a non-contact operation against the image object. The motion detecting device is configured to detect motion of the vehicle or motion of the occupant caused by the motion of the vehicle. The operation determining unit is configured to adjust, on the basis of a detection result of the motion detecting device, a detection result of the operation detecting device to suppress the motion of the occupant caused by the motion of the vehicle. The operation determining unit is configured to determine presence or absence of the operation against the image object by the operation site of the occupant on the basis of the adjusted detection result.

An aspect of the technology provides a vehicle that includes a non-contact operating apparatus and two or more control devices. The non-contact operating apparatus includes a generating unit, a projecting device, an operation detecting device, an operation determining unit, and a motion detecting device. The generating unit is configured to generate and update an image containing an image object. The image object is operable by an occupant present within a vehicle compartment of the vehicle. The projecting device is configured to project the image in a predetermined display region within the vehicle compartment of the vehicle. The operation detecting device is configured to detect an operation site of the occupant positioned in a vicinity of the predetermined display region within the vehicle compartment. The operation determining unit is configured to determine, on the basis of a position or motion of the operation site of the occupant with respect to the image object, whether the operation site of the occupant detected by the operation detecting device performs a non-contact operation against the image object. The motion detecting device is configured to detect motion of the vehicle or motion of the occupant caused by the motion of the vehicle. The operation determining unit is configured to adjust, on the basis of a detection result of the motion detecting device, a detection result of the operation detecting device to suppress the motion of the occupant caused by the motion of the vehicle. The operation determining unit is configured to determine presence or absence of the operation against the image object by the operation site of the occupant on the basis of the adjusted detection result. The two or more control devices are coupled to the non-contact operating apparatus through an internal network. Each of the two or more control devices is configured to control an operation of the vehicle. Each of the two or more control devices is configured to acquire input information from the non-contact operating apparatus through the internal network. The input information is generated on the basis of the non-contact operation of the occupant against the image object in the image. The image is projected within the vehicle compartment by the non-contact operating apparatus.

An aspect of the technology provides a non-contact operating apparatus, for a vehicle, that includes circuitry, a projecting device, an operation detecting device, and a motion detecting device. The circuitry is configured to control an operation of the non-contact operating apparatus. The projecting device is configured to project an image containing an image object in a predetermined display region within a vehicle compartment of the vehicle. The image object is operable by an occupant present within the vehicle compartment. The operation detecting device is configured to detect an operation site of the occupant positioned in a vicinity of the predetermined display region within the vehicle compartment. The motion detecting device is configured to detect motion of the vehicle or motion of the occupant caused by the motion of the vehicle. The circuitry is configured to generate and update the image. The circuitry is configured to determine, on the basis of a position or motion of the operation site of the occupant with respect to the image object, whether the operation site of the occupant detected by the operation detecting device performs a non-contact operation against the image object. The circuitry is configured to adjust, on the basis of a detection result of the motion detecting device, a detection result of the operation detecting device to suppress the motion of the occupant caused by the motion of the vehicle. The circuitry is configured to determine presence or absence of the operation against the image object by the operation site of the occupant on the basis of the adjusted detection result.

BRIEF DESCRIPTION OF THE DRAWINGS

The accompanying drawings are included to provide a further understanding of the disclosure, and are incorporated in and constitute a part of this specification. The drawings illustrate some example embodiments and, together with the specification, serve to explain the principles of the disclosure.

DETAILED DESCRIPTION

Figure 1A:
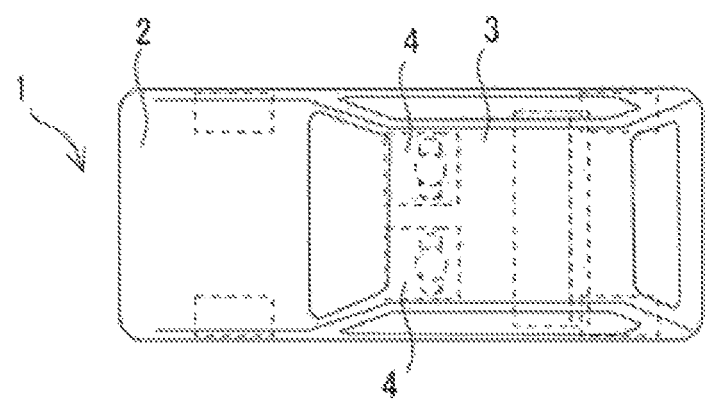
FIGS. 1A and 1B are each a schematic explanatory diagram illustrating an example of a vehicle according to one example embodiment of the technology.

Hereinafter, some example embodiments of the technology will be described with reference to the drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

As disclosed in Japanese Unexamined Patent Application Publication (JP-A) No. 2017-027401, development of a new operating apparatus directed to operating of an image projected in a vehicle compartment of a vehicle has been required for the vehicle.

An operation apparatus for a vehicle disclosed in JP-A No. 2017-027401 described above presents an image, containing an image object, in front of an occupant who sits on a seat, and outputs a tactile stimulation based on an ultrasound field to an operation site of the occupant in response to an operation of the occupant against the presented image object. For this reason, the occupant is allowed to obtain an actual sensation of the operation against the image object.

However, the vehicle travels and moves on a road. The traveling vehicle increases or decreases in speed, or turns right or left in order to travel smoothly. This causes a load to act on the vehicle. When a load acts on the vehicle, for example, due to an increase or a decrease in speed of the vehicle, a body of the occupant moves so as to be carried in a direction of the action. In this case, for example, a hand or a finger of the occupant who tries to operate the image object may be swung or shifted due to motion of the occupant caused by motion of the vehicle.

As disclosed in JP-A No. 2017-027401, in a case where an image containing an image object is fixedly projected in such a traveling state and an operation against the image object is fixedly determined, it may be difficult to accurately determine the operation that the occupant tries to perform against the image object. Further, in a case where a tactile stimulation is fixedly outputted in response to the operation of the occupant on the basis of such determination, it may also be difficult to accurately output the tactile stimulation to an operation site of the occupant who operates the image object.

Therefore, in order to resolve a concern described above, it has been required to improve the operating apparatus for a vehicle.

First Example Embodiment

Figure 1B:
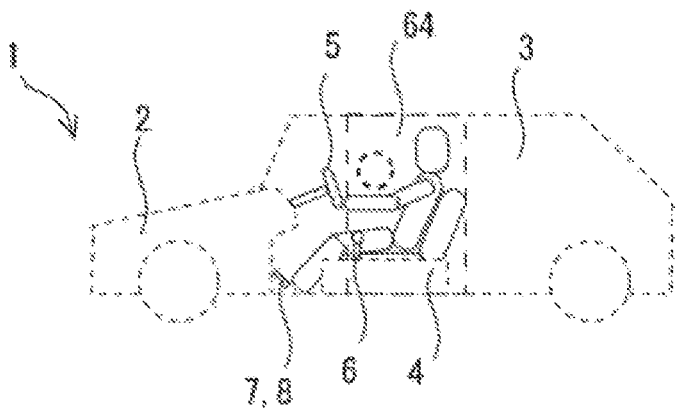

FIGS. 1A and 1B are each a schematic explanatory diagram illustrating a vehicle 1 according to a first example embodiment of the technology.

FIG. 1A is a top view of the vehicle 1. FIG. 1B is a side view of the vehicle 1.

The vehicle 1 illustrated in FIGS. 1A and 1B may be one example of a vehicle. The vehicle 1 may include a vehicle body 2. A vehicle compartment 3 may be provided in the vehicle body 2. One or more occupants may be allowed to be present in the vehicle compartment 3. Two or more seats 4 on each of which the occupant sits may be provided in the vehicle compartment 3. A handle 5, a shift lever 6, a brake pedal 7, and an accelerator pedal 8 may be provided in a front portion of the vehicle compartment 3 as operating members in order for the occupant, e.g., a driver, to operate the operating members directed to traveling of the vehicle 1. As illustrated in FIG. 1B, the driver may sit on the seat 4 with a driving posture, and may be thereby allowed to operate any of these operating members such as the handle 5 by stretching his or her hand to the operating member.

Further, as illustrated in FIG. 1B, a hollow square frame body 64 of a stimulation output device 45, which will be described later, may be provided in the vehicle compartment 3.

Figure 2:
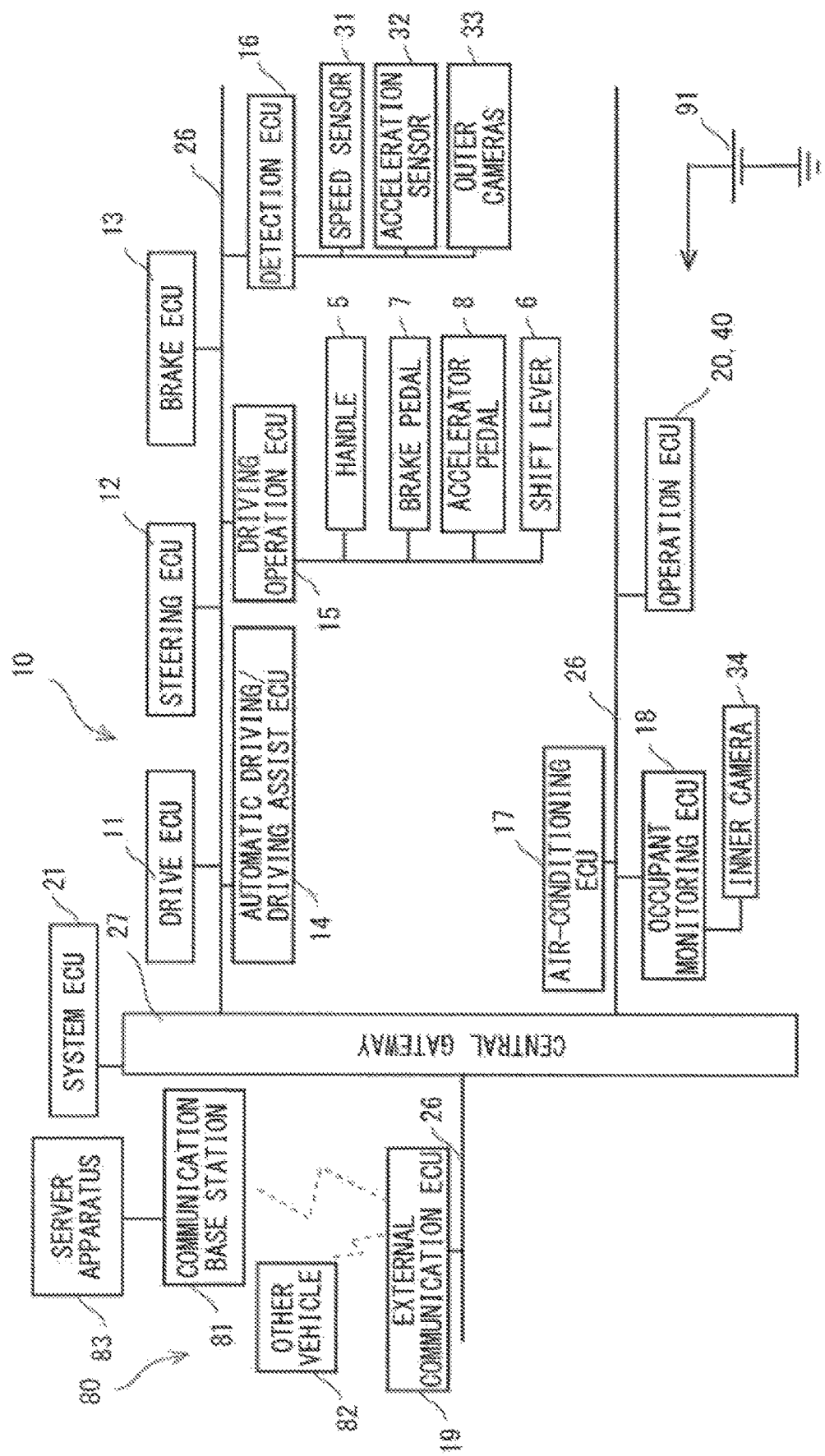
FIG. 2 is a schematic explanatory diagram illustrating an example of a control system in the vehicle illustrated in FIG. 1.

FIG. 2 is a schematic explanatory diagram illustrating a control system 10 in the vehicle 1 illustrated in FIGS. 1A and 1B. FIG. 2 illustrates two or more control devices that may be included in the control system 10 as represented by control electronic control units (ECUs) incorporated in the respective two or more control devices.

In a specific but non-limiting example, FIG. 2 illustrates a drive ECU 11, a steering ECU 12, a brake ECU 13, an automatic driving/driving assist ECU 14, a driving operation ECU 15, a detection ECU 16, an air-conditioning ECU 17, an occupant monitoring ECU 18, an external communication ECU 19, an operation ECU 20 as a non-contact operating apparatus 40, and a system ECU 21. For example, a vehicle network (internal network) 26 such as a controller area network (CAN) or a local interconnect network (LIN) may be adopted in the vehicle 1. The above-described control ECUs may be coupled to a central gateway (CGW) 27 via the vehicle network 26. The central gateway 27 may serve as a relay apparatus.

In each of control modules, the corresponding control ECU may be coupled to at least one electronic device used in the vehicle 1. When activated, each control ECU may execute various kinds of processes to control an operation of an electronic device coupled to the corresponding control ECU on the basis of information or data acquired from the vehicle network 26. Further, each control ECU may output information or data such as an operation state of the corresponding electronic device to the vehicle network 26.

Unillustrated operation detecting sensors for devices, such as the handle 5, the brake pedal 7, the accelerator pedal 8, or the shift lever 6, which the occupant operates to control the traveling of the vehicle 1, may be coupled to the driving operation ECU 15. The driving operation ECU 15 may output control information based on an operation amount detected by each of the operation detecting sensors to the vehicle network 26. The drive ECU 11, the steering ECU 12, and the brake ECU 13 may acquire necessary information from the vehicle network 26, and control the traveling of the vehicle 1.

The operation ECU 20 may acquire the control information from the driving operation ECU 15 through the vehicle network 26, and cause an unillustrated display device to display the acquired control information. An unillustrated operation device to be operated by the occupant may be coupled to the operation ECU 20 in addition to the display device. For example, the operation ECU 20 may be included in an operating apparatus for a driving operation together with the display device and the operation device. The non-contact operating apparatus 40, which will be described later, may be incorporated in the operating apparatus for the driving operation. In a case where the occupant operates the operation device with respect to the control information displayed by the display device, the operation ECU 20 may output input information against the operation device to the driving operation ECU 15 through the vehicle network 26. The driving operation ECU 15 may acquire the input information through the vehicle network 26, and execute a control based on the input information.

For example, a speed sensor 31 for the vehicle 1, an acceleration sensor 32, and outer cameras 33 may be coupled to the detection ECU 16. The acceleration sensor 32 may detect acceleration of the vehicle 1 due to, for example, contact of the vehicle 1. Each of the outer cameras 33 may capture an image of the surroundings of the vehicle 1. The detection ECU 16 may output detection values acquired from the speed sensor 31 and the acceleration sensor 32 of the vehicle 1 and images acquired from the respective outer cameras 33 to the vehicle network 26. In one example, the detection ECU 16 may predict contact of the vehicle 1 on the basis of the images from the outer cameras 33, and output a prediction result to the vehicle network 26. The central gateway 27 may relay various kinds of information.

For example, the automatic driving/driving assist ECU 14 may control traveling of the vehicle 1 until the vehicle 1 arrives at a destination for the vehicle 1, which is set by the occupant. The automatic driving/driving assist ECU 14 may acquire, for example, information on the speed and the acceleration of the vehicle 1 and the images of the outer cameras 33 from the detection ECU 16 through the vehicle network 26, and output control information for safety traveling to the vehicle network 26. The drive ECU 11, the steering ECU 12, and the brake ECU 13 may acquire the control information for the safety traveling from the vehicle network 26, and control the traveling of the vehicle 1.

The operation ECU 20 may acquire various kinds of information from the detection ECU 16 and the automatic driving/driving assist ECU 14 through the vehicle network 26, and cause the display device to display the various kinds of information thus acquired. In a case where the occupant operates the operation device with respect to the various kinds of information displayed by the display device, the operation ECU 20 may output the input information against the operation device to the vehicle network 26. The detection ECU 16 and the automatic driving/driving assist ECU 14 may acquire the input information through the vehicle network 26, and execute a control based on the acquired input information.

An inner camera 34 may be coupled to the occupant monitoring ECU 18. The occupant monitoring ECU 18 may identify the occupant who is present in the vehicle 1 on the basis of the image captured by the inner camera 34, and monitor a riding state of the occupant. The captured image and an identification result may be information regarding the occupant. Hereinafter, the information regarding the occupant is referred to as "occupant information." The occupant monitoring ECU 18 may output the occupant information to the vehicle network 26. The operation ECU 20 may acquire the occupant information from the occupant monitoring ECU 18 through the vehicle network 26, and cause the display device to display the occupant information. In a case where the occupant operates the operation device with respect to the occupant information displayed by the display device, the operation ECU 20 may output the input information against the operation device to the vehicle network 26. The occupant monitoring ECU 18 may acquire the input information through the vehicle network 26, and execute a control based on the acquired input information.

The air-conditioning ECU 17 may control environment such as temperature or humidity of the vehicle compartment 3. The air-conditioning ECU 17 may output in-vehicle information on temperature, an amount of solar radiation, humidity, or any other factor detected by an unillustrated sensor such as a temperature sensor to the vehicle network 26. The operation ECU 20 may acquire the in-vehicle information from the air-conditioning ECU 17 through the vehicle network 26, and cause the display device to display the acquired in-vehicle information. In a case where the occupant operates the operation device with respect to the in-vehicle information displayed by the display device, the operation ECU 20 may output the input information against the operation device to the vehicle network 26. The air-conditioning ECU 17 may acquire the input information through the vehicle network 26, and execute a control based on the acquired input information.

The external communication ECU 19 may communicate wirelessly with any of a communication base station 81 existing outside the vehicle 1 and a communication device of another vehicle 82, for example. The communication base station 81 and the communication device of the other vehicle 82 may be included in a transportation system 80 together with a server apparatus 83. The external communication ECU 19 may receive information on the transportation system 80 from the communication base station 81 or the communication device of the other vehicle 82, and output the information to the vehicle network 26. The operation ECU 20 may acquire the information received by the external communication ECU 19 through the vehicle network 26, and cause the display device to display the information. In a case where the occupant operates the operation device with respect to the information displayed by the display device, the operation ECU 20 may output the input information against the operation device to the vehicle network 26. The external communication ECU 19 may acquire the input information through the vehicle network 26, and transmit the input information to the communication base station 81 or the communication device of the other vehicle 82 by wireless communication. The transmitted information may be utilized by the server apparatus 83 or the other vehicle 82 in the transportation system 80, for example. This makes it possible for the operation ECU 20 of the vehicle 1, for example, to transmit and receive the information or data to and from the server apparatus 83 and the other vehicle 82 in the transportation system 80 through the external communication ECU 19.

Further, the control system 10 illustrated in FIG. 2 may be configured to operate by supplying of electric power from a battery 91 provided in the vehicle 1 to each of the units. Power supply lines from the battery 91 to the respective units may be spread all over the vehicle 1 together with communication cables for the vehicle network 26, for example. In one example, electric power may be supplied to the control system 10 from a power generator or a power receiving device in addition to the battery 91.

Thus, the operation ECU 20 may be coupled to the control ECUs of the other control devices through the vehicle network 26 of the vehicle 1, whereby it is possible for the operation ECU 20 to transmit and receive the information or data to and from the control ECUs of the other control devices. Further, in FIG. 2, each of the control ECUs other than the operation ECU 20 may acquire the input information from the operation ECU 20 as the non-contact operating apparatus 40 through the vehicle network 26, and control an operation of the vehicle 1 on the basis of the acquired input information.

Various kinds of devices and operating members thereof may be provided in the vehicle 1 as described above. For example, the operating members including the start switch, the handle 5, the shift lever 6, the brake pedal 7, and the accelerator pedal 8 directed to controlling of the traveling of the vehicle 1 may be provided in the vehicle 1. Further, operating members for an air conditioner, a navigation apparatus, an audio device, an image receiving device, a handsfree calling device, and other equipment devices may also be provided in the vehicle 1 in addition to the operating members for the devices described above. Thus, a large number of operating members may be provided in the vehicle 1. The large number of operating members may be laid out on an inner surface of the vehicle compartment 3. However, in recent years, the inner surface for layout of the vehicle compartment 3 tends to become insufficient. For example, in a case where it is considered that a game machine, a network communication device, an entertainment device, or any other device may be added thereto, there is a possibility that operating members for these devices cannot further be added in the future.

For this reason, development of a new operating apparatus directed to operating of an image projected in the vehicle compartment 3 of the vehicle 1 may be required for the vehicle 1, for example. Hereinafter, for example, a projected object is referred to as an "image object." For example, the non-contact operating apparatus 40 may be considered as such an operating apparatus. The non-contact operating apparatus 40 may project an image in a space in front of the occupant who sits on the seat 4. The non-contact operating apparatus 40 may generate input information in response to an operation of the occupant against an image object in the projected image, and output the generated input information to the vehicle network 26. Further, in one example, the non-contact operating apparatus 40 may output a tactile stimulation based on an ultrasound field to an operation site of the occupant in response to the operation of the occupant against the projected image object. By acquiring the response by such a tactile stimulation, the occupant may be allowed to obtain an actual sensation of the operation despite a non-contact operation against the image object projected in the space within the vehicle compartment 3, in the similar manner that the occupant actually performs the operation against a substantial object.

However, the vehicle 1 may travel and move on a road or the like. A load acts on the vehicle 1 while traveling by increasing or decreasing in speed or turning right or left for traveling. When the load acts on the vehicle 1, for example, due to an increase or a decrease in speed of the vehicle 1, a body of the occupant so moves as to be carried due to motion of the vehicle 1. In this case, for example, a hand or a finger of the occupant who tries to operate the image object may be swung or a position thereof may be shifted due to the motion of the occupant caused by the motion of the vehicle 1.

As disclosed in JP-A No. 2017-027401, in a case where an image is fixedly projected in such a traveling state and an operation against an image object in the image is fixedly determined or a tactile stimulation against the operation is fixedly outputted, it may be difficult to accurately determine the operation that the occupant tries to perform against the image object, or it may be difficult to accurately output the tactile stimulation to the operation site by which the occupant operates the image object.

Thus, it is required to further improve the operating apparatus of the vehicle 1.

Figure 3:
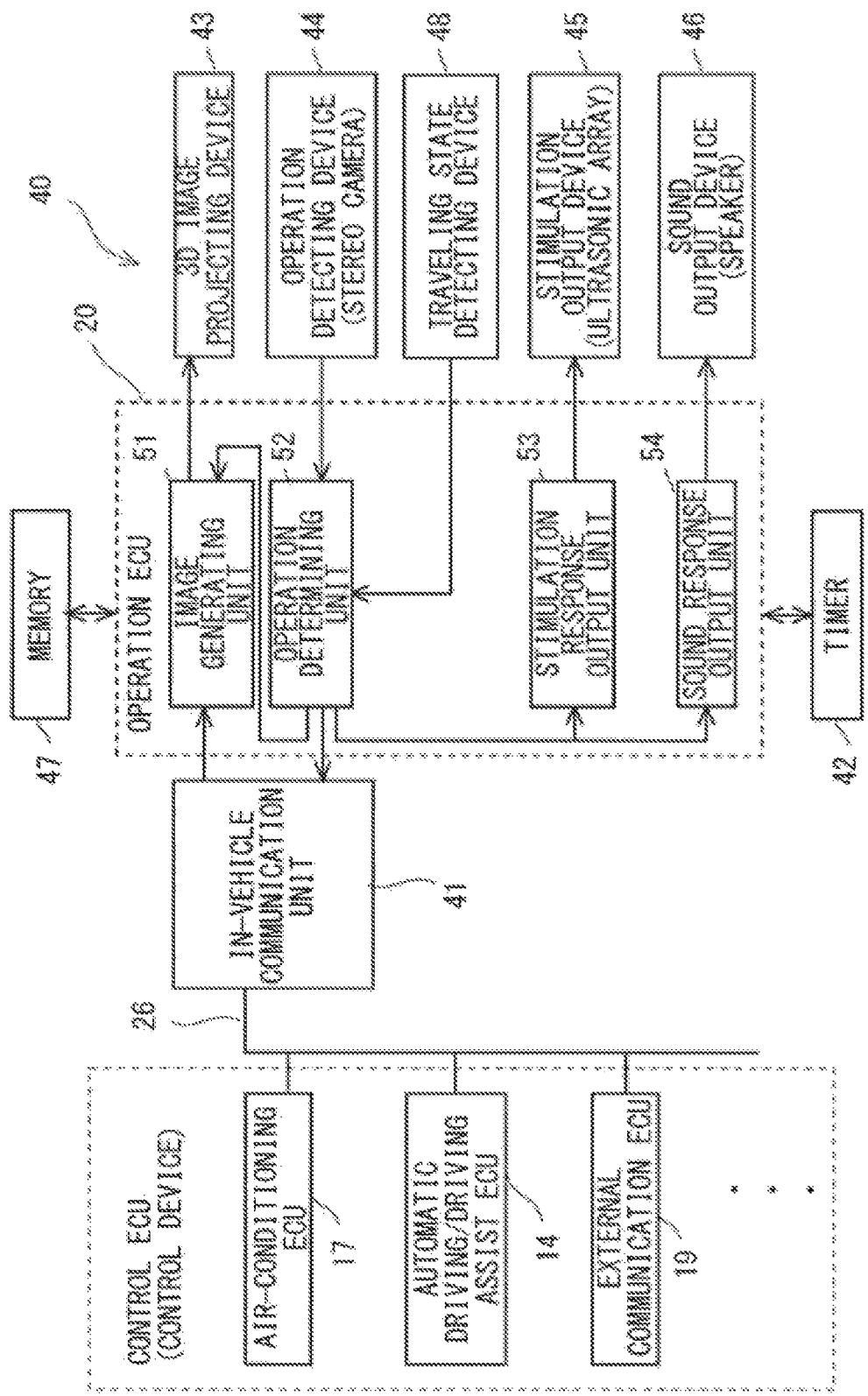
FIG. 3 is a block diagram illustrating an example of a configuration of a non-contact operating apparatus provided in the vehicle illustrated in FIG. 1.

FIG. 3 is a block diagram illustrating a configuration of the non-contact operating apparatus 40 to be provided in the vehicle 1 illustrated in FIG. 1.

The non-contact operating apparatus 40 illustrated in FIG. 3 may include, for example but not limited to, an in-vehicle communication unit 41, a timer 42, a 3D image projecting device 43, an operation detecting device 44, a stimulation output device 45, a sound output device 46, a memory 47, a traveling state detecting device 48, and the operation ECU 20 to which the aforementioned devices are coupled.

The memory 47 may be a non-volatile memory, for example, and may be coupled to the operation ECU 20. Programs and data for the non-contact operating apparatus 40 may be stored in the memory 47. In one example, the programs may be ones in which processes are executed by artificial intelligence (AI). In one example, the programs may include a learning program for AI processing. The data may contain, for example but not limited to, three-dimensional model data for an image to be projected during a non-contact operation. The three-dimensional model data may be image data for the non-contact operation, and contain a plurality of pieces of polygon data that is to be included in a surface of the model, for example.

For example, the operation ECU 20 may be a central processing unit (CPU), or a microcomputer such as an application specific integrated circuit (ASIC) or a digital signal processor (DSP). The operation ECU 20 may read out a program for the non-contact operation from the memory 47, and execute the program. This may implement a control unit of the non-contact operating apparatus 40 in the operation ECU 20. The control unit of the non-contact operating apparatus 40 may control a general operation of the non-contact operating apparatus 40, and implement various kinds of performance for the non-contact operation in the non-contact operating apparatus 40. For example, the operation ECU 20 may implement, as the various kinds of performance for the non-contact operation, an image generating unit 51, an operation determining unit 52, a stimulation response output unit 53, and a sound response output unit 54.

The in-vehicle communication unit 41 may be coupled to the vehicle network 26. As illustrated in FIG. 3, the in-vehicle communication unit 41 may transmit and receive information or data to and from the other control ECU such as the air-conditioning ECU 17, the automatic driving/driving assist ECU 14, or the external communication ECU 19 through the vehicle network 26, for example. For example, the in-vehicle communication unit 41 may acquire a display instruction to display an image object for air conditioning operation from the air-conditioning ECU 17, and output the display instruction to the operation ECU 20. The in-vehicle communication unit 41 may acquire a display instruction to display an image object for setting operation for automatic driving/driving assist from the automatic driving/driving assist ECU 14, and output the display instruction to the operation ECU 20. In one example, the in-vehicle communication unit 41 may acquire content data such as the three-dimensional model data from the external communication ECU 19, and output the acquired content data to the operation ECU 20.

The timer 42 may measure an elapsed time or a time. The elapsed time or the time measured by the timer 42 may be outputted to the operation ECU 20.

The image generating unit 51 generates and updates an image to be projected by the 3D image projecting device 43. In a specific but non-limiting example, the image generating unit 51 may acquire the three-dimensional model data from the memory 47 or the in-vehicle communication unit 41 on the basis of the display instruction inputted from the in-vehicle communication unit 41 in order to generate data of an image to be projected. The image generating unit 51 may generate a three-dimensional model from the acquired three-dimensional model data. The image generating unit 51 may determine a projected position and a direction of the three-dimensional model in the vehicle compartment 3 viewed from the occupant, and generate image data for projection from the three-dimensional model (or a stereoscopic model.) The image generating unit 51 may output the image data for projection to the 3D image projecting device 43. In one example, the image generating unit 51 may generate a two-dimensional model (or a planar model) from two-dimensional model data, and generate image data for projection. It is to be noted that, also in a case where a display instruction is not inputted from the in-vehicle communication unit 41, the image generating unit 51 may acquire content data such as a moving image or a still image from the memory 47 or the in-vehicle communication unit 41, generate image data of the content as a three-dimensional image (stereoscopic image) or a two-dimensional image (planar image), and output the image data to the 3D image projecting device 43.

The 3D image projecting device 43 projects the 3D (three-dimensional) image or the 2D (two-dimensional) image, which is operable by the occupant, to a space, that is, a predetermined display region, within the vehicle compartment 3 of the vehicle 1. The 3D image projecting device 43 may be a display device or a projector, for example. The 3D image projecting device 43 may project an image to a hollow space within the vehicle compartment 3 by a hologram system or a mirror system, for example. The 3D image projecting device 43 may be disposed at a position in front of the seat 4 on which the occupant sits, for example but not limited to, on a dashboard, a rearview mirror, a back mirror, or a roof of the vehicle compartment 3. The 3D image projecting device 43 projects the 3D (three-dimensional) image or the 2D (two-dimensional) image to the space within the vehicle compartment 3 of the vehicle 1. Thus, the stereoscopic image may be projected to the projected position of the vehicle compartment 3 so that the occupant is allowed to visually recognize the three-dimensional model.

The operation detecting device 44 detects a predetermined operation site of the occupant. The operation detecting device 44 may detect motion of a body, an upper body, a shoulder, a head of the occupant, which may swing due to a load onto the vehicle 1. In one example, the operation detecting device 44 may detect the operation site of the occupant who performs the non-contact operation against the image object of the image projected in the space within the vehicle compartment 3. The non-contact operation may include, for example but not limited to, a hand operation against the image object and a movement operation to move the image object. In one example, the operation detecting device 44 may be disposed at a position in front of the seat 4 on which the occupant sits, for example but not limited to, on the dashboard, the rearview mirror, the back mirror, or the roof of the vehicle compartment 3, for example. In a case where the inner camera 34 as an occupant monitoring apparatus is disposed at a location such as on the dashboard, the rearview mirror, or the back mirror, the operation detecting device 44 may also be used as the inner camera 34. The operation detecting device 44 may include a stereo camera 63 in which two imaging devices are arranged side by side, for example. In this case, the operation detecting device 44 may detect, by the images of the two imaging devices, an operation by a predetermined operation site of the occupant against an image projected in midair of the vehicle compartment 3. Hereinafter, the aforementioned operation by the predetermined operation site of the occupant may be referred to also as an "operation of the occupant," and the aforementioned image projected in midair of the vehicle compartment 3 may be referred to also as a "projected image."

The operation determining unit 52 may acquire detected information such as the image of the stereo camera 63 from the operation detecting device 44, for example, and determine the non-contact operation of the occupant against the image object in the image projected in the space within the vehicle compartment 3 on the basis of the detected information. The operation determining unit 52 may determine, for example, a position and motion of the operation site of the occupant as the operation of the occupant against the image object projected in the space within the vehicle compartment 3. The motion may include information on motion of the operation site, such as a direction, a speed, or an acceleration of movement. The operation determining unit 52 may acquire a pixel position including a feature of a fingertip of the occupant from the image by AI processing, for example, and generate positional information on the fingertip by a triangulation method for the image of the stereo camera 63. The operation determining unit 52 may generate information on motion of the fingertip, for example, a movement direction, a movement speed, an acceleration of the movement from an imaging result obtained by shifting a time. The operation determining unit 52 may determine, for example, the position and the motion of the operation site of the occupant on the basis of the projected position of the image object, and determine the operation of the occupant against the image object projected in the space within the vehicle compartment 3. The operation determining unit 52 may determine, for example but not limited to, presence or absence of contact of the operation site of the occupant against the projected image object, a remaining distance to contact, and a depth to contact. Information related to the presence or absence of contact of the operation site of the occupant against the projected image object, the remaining distance to contact, the depth to contact, and any other suitable information may be hereinafter referred to as "operational information." The operation determining unit 52 may output the determined operational information to the respective units of the operation ECU 20. Namely, the operation determining unit 52 may output the operational information to the image generating unit 51, the stimulation response output unit 53, and the sound response output unit 54, for example. In one embodiment, the operation determining unit 52 and the operation detecting device 44 may serve as a "detecting device." The image generating unit 51 updates the image data for projection in response to the operation of the occupant, and may output the updated image data to the 3D image projecting device 43. Thus, the image to be projected by the 3D image projecting device 43 in the predetermined display region within the vehicle compartment 3 may be updated in response to the operation of the occupant.

Further, in a case where it is determined that the operation of the occupant against the image object projected in the space within the vehicle compartment 3 is performed, on the basis of the determined operational information, the operation determining unit 52 may output input information based on the operation of the occupant to the respective ECUs of the vehicle 1 through the in-vehicle communication unit 41. For example, in a case where an operation button directed to varying of set temperature of the air conditioner is operated by the occupant in a state where the operation button is projected as the image object, the operation determining unit 52 may generate input information corresponding to the operation button, and output the generated input information to the in-vehicle communication unit 41. The in-vehicle communication unit 41 may output the input information to the air-conditioning ECU 17 as the control device through the vehicle network 26. The air-conditioning ECU 17 may vary target set temperature for the air conditioner on the basis of the input information, and so execute an air-conditioning control that the temperature in the vehicle compartment 3 becomes the target set temperature.

The traveling state detecting device 48 may detect a traveling state of the vehicle 1. The traveling state detecting device 48 may detect, as the traveling state of the vehicle 1, motion of the vehicle 1 due to the traveling, for example. Information on the motion of the vehicle 1 due to the traveling may include, for example but not limited to, weight acting on the vehicle 1, a speed of the vehicle 1, an acceleration of the vehicle 1, and a yaw rate.

Figure 4:
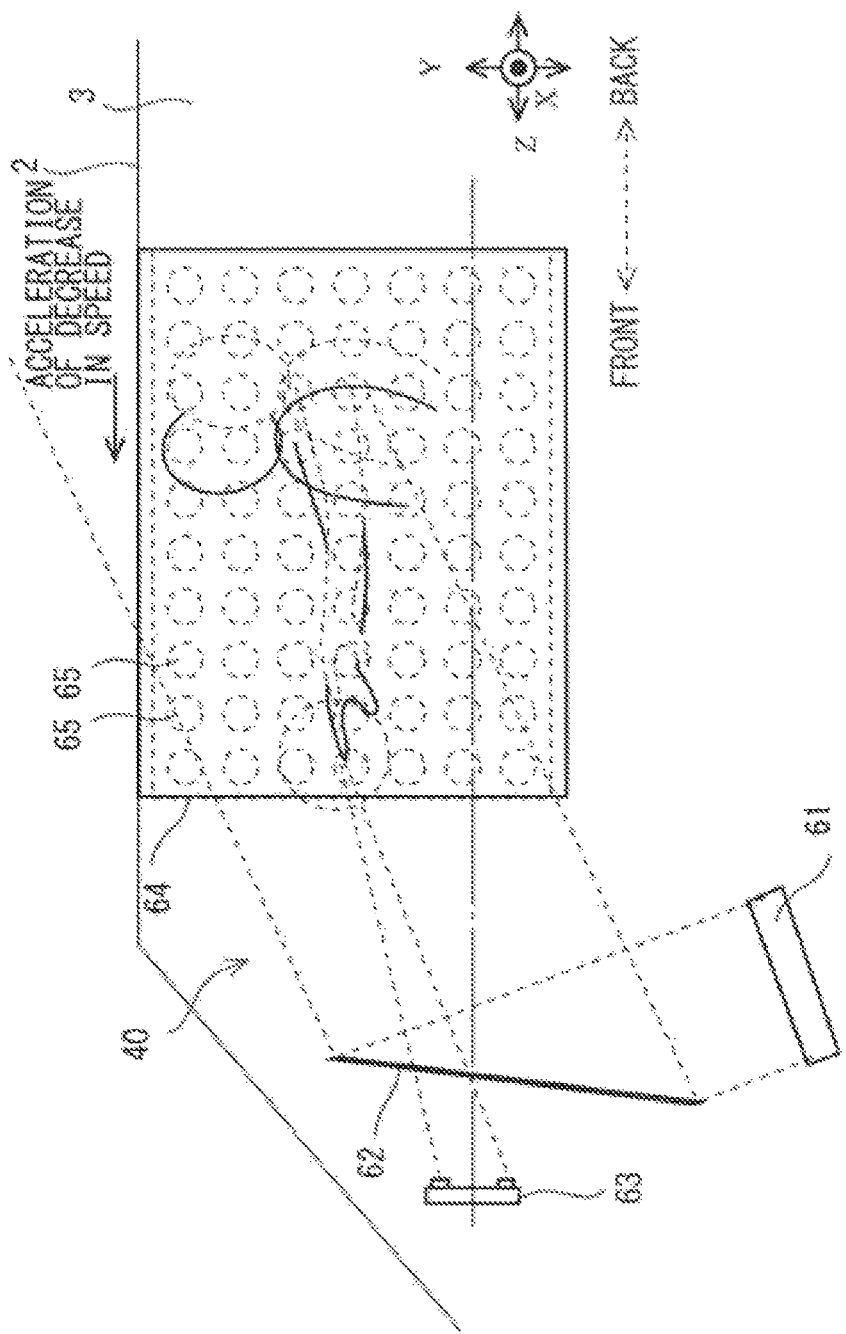
FIG. 4 is an explanatory diagram illustrating an example of arrangement of main components of the non-contact operating apparatus illustrated in FIG. 3 in a vehicle compartment.

The stimulation output device 45 may be so arranged as to correspond to the operation site of the occupant who operates the image object. The stimulation output device 45 may be any device that is configured to output, for example, by an electrical signal, a tactile stimulation to the operation site of the occupant. As a device that gives a tactile sensation without contact, there is one that generates a field of ultrasound waves and outputs a tactile sensation to a skin of an operation site by applying the field of ultrasound waves or variation in the field to the operation site of the occupant, for example. In one example, the stimulation output device 45 may include an element array in which a plurality of ultrasonic elements 65 is arranged in a planar manner as illustrated in FIG. 4, for example. The stimulation output device 45 may be provided at a position apart from and under the operation site, such as the hand, of the occupant who is present in the vehicle compartment 3, for example. By selectively outputting the ultrasound waves from the plurality of ultrasonic elements 65, it is possible to generate a tactile sensation at a local site of the hand of the occupant who operates the image object, for example, the fingertip, as if a skin of the fingertip of the occupant is touching an object.

The stimulation response output unit 53 may cause the stimulation output device 45 to output the tactile stimulation based on the ultrasound field to the operation site of the occupant who operates the projected image object. Namely, the stimulation response output unit 53 may cause the stimulation output device 45 to output the tactile stimulation as a response to the operation of the occupant against the image object. The stimulation response output unit 53 may output an electrical signal to the stimulation output device 45, and cause one or more of the plurality of ultrasonic elements 65 to selectively output ultrasound waves based on the operation. Thereby, the stimulation response output unit 53 is allowed to generate an ultrasound field in a predetermined region within the vehicle compartment 3. The stimulation response output unit 53 may locally apply the field of the ultrasound waves or the variation in the field to the operation site of the occupant that is determined to be in contact with the image object by the operation determining unit 52. Here, when a person puts his or her hand into an ultrasound field, for example, the person is allowed to feel the ultrasound field with a skin of a surface of the hand. Thereby, the stimulation response output unit 53 may be able to cause the stimulation output device 45 to output, as a response to the operation, a stimulation of a tactile sensation by the ultrasound field to the operation site of the occupant that performs the non-contact operation against the image object projected in the space within the vehicle compartment 3. The stimulation response output unit 53 may locally apply the field of the ultrasound waves or the variation in the field to a surface of the image object with which the operation site of the occupant is virtually in contact, for example.

In addition, for example, in one example, the stimulation output device 45 may include an element array in which a plurality of pressure output elements is arranged. In this case, the stimulation response output unit 53 may control operations of the plurality of pressure output elements separately, whereby a pressure acts on the skin of the person. This makes it possible for the occupant to obtain feeling based on the operation.

The sound output device 46 may be a speaker, for example. The speaker may be driven by a sound signal. The sound output device 46 may output a sound based on the operation of the occupant, for example. It may be sufficient that the sound output device 46 is arranged in the vehicle compartment 3.

The sound response output unit 54 may output a sound signal to the sound output device 46 to output a sound based on the operation from the sound output device 46. The sound response output unit 54 may select and acquire audio data recorded in the memory 47 in response to the operation of the occupant, and output a sound signal generated from the acquired audio data to the speaker as the sound output device 46. This allows the occupant to hear various kinds of sounds based on the operation.

FIG. 4 is an explanatory diagram illustrating an example of arrangement of main components of the non-contact operating apparatus 40 illustrated in FIG. 3 in the vehicle compartment 3.

FIG. 4 schematically illustrates one example of a specific but non-limiting combination of the 3D image projecting device 43, the operation detecting device 44, and the stimulation output device 45, which are illustrated in FIG. 3.

As a specific but non-limiting example, FIG. 4 illustrates a display screen 61 and a half mirror 62 as the 3D image projecting device 43. FIG. 4 also illustrates the stereo camera 63 as the operation detecting device 44. FIG. 4 also illustrates an element array as the stimulation output device 45. The aforementioned main components of the non-contact operating apparatus 40 may be provided within the vehicle compartment 3 of the vehicle 1.

The stimulation output device 45 may have the hollow square frame body 64. An element array in which the plurality of ultrasonic elements 65 is regularly arranged, for example, may be provided on each of four surfaces of the square frame body 64. By appropriately causing the element arrays provided on upper, lower, right, and left surfaces of the square frame body 64 to operate, as illustrated in FIG. 4, an ultrasound field may locally act on a fingertip entering the inside of the square frame body 64. This makes it possible for the occupant to obtain a tactile sensation as if the fingertip is touched by something.

The half mirror 62 may be provided in front of the hollow square frame body 64 of the stimulation output device 45. The half mirror 62 may be so provided as to face the occupant. The display screen 61 configured to display a three-dimensional image (stereoscopic image) or a two-dimensional image (planar image) may be disposed under the half mirror 62. The image displayed on the display screen 61 may be reflected by the half mirror 62, whereby the occupant may be allowed to visually recognize the three-dimensional image (stereoscopic image) or the two-dimensional image (planar image) inside the hollow square frame body 64 in the stimulation output device 45. The occupant may be allowed to visually recognize the image projected inside the hollow square frame body 64 in the stimulation output device 45 and in midair within the vehicle compartment 3. In the example embodiment, the occupant may be allowed to visually recognize that a sphere indicated by a circle in FIG. 4 as the three-dimensional image is floating inside the hollow square frame body 64.

The stereo camera 63 may be provided on the opposite side of the half mirror 62 with respect to the stimulation output device 45, for example. In this case, the two imaging devices of the stereo camera 63 may be allowed to capture, for example, images of a finger of the occupant that is present inside the square frame body 64. Thereby, the stereo camera 63 may be allowed to capture an image of, for example, the finger of the occupant that enters the hollow square frame body 64 of the stimulation output device 45.

Hereinafter, as needed, on the basis of FIG. 4, a direction from an axial center of the square frame body 64 toward the occupant may be referred to as a Z direction, and directions perpendicular to the Z direction may be referred to as a Y direction and an X direction. Here, the Z direction may usually become a direction along a front-back direction of the vehicle 1.

It is to be noted that components of the non-contact operating apparatus 40 illustrated in FIG. 3 are not necessarily arranged so as to be crowded as illustrated in FIG. 4.

For example, in a case where the hollow square frame body 64 of the stimulation output device 45 is arranged in front of the occupant, the hollow square frame body 64 may become an encumbrance to an operation when the occupant operates the operating member such as the handle 5. As illustrated in FIG. 1, the hollow square frame body 64 may be provided in a square frame shape along peripheral surfaces of the vehicle body 2. In this case, any structural object such as the square frame body 64 may not be provided in front of the seat 4 on which the occupant sits. Also in this case, as illustrated in FIG. 4 by dotted circles as spherical images, the 3D image projecting device 43 may be allowed to project an image in a space inside the hollow square frame body 64 provided within the vehicle compartment 3, for example. The occupant may be allowed to perform the non-contact operation against the image object by operating the image object in the operation region inside the square frame body 64. The hollow square frame body 64 may not necessarily have a square frame shape. The element array may merely be arranged along the peripheral surfaces of the vehicle body 2. In an alternative example, the element array may be disposed on the inner surface of the vehicle compartment 3 as a whole.

The half mirror 62 may basically be so provided as to oppose the occupant with the hollow square frame body 64 of the stimulation output device 45 in between. Further, if the image is merely projected in midair inside the square frame body 64, a fully-reflective mirror may be used in place of the half mirror 62. Further, in one example, the display screen 61 itself may be disposed at a position opposing the occupant with the hollow square frame body 64 of the stimulation output device 45 in between. In this case, the half mirror 62 or the fully-reflective mirror may not be required. In one example, the half mirror 62 or the fully-reflective mirror and the display screen 61 may be disposed on the dashboard, the rearview mirror, or the roof, for example. Further, the half mirror 62 or the fully-reflective mirror and the display screen 61 may be integrated with the occupant monitoring apparatus.

The operation detecting device 44 such as the stereo camera 63 may be disposed on the dashboard, the rearview mirror, or the back mirror, for example. Further, the operation detecting device 44 may be used also as an imaging device of the occupant monitoring apparatus such as a display management system (DMS). The operation detecting device 44 such as the stereo camera 63 may be any device as long as the device is able to capture an image of an operation site such as the fingertip of the occupant. Further, a detected medium for the operation detecting device 44 is not limited to an image. For example, the inside of the vehicle compartment 3 may be scanned by laser, and a site such as a fingertip of the occupant may be detected on the basis of a scanning result.

Figure 5:
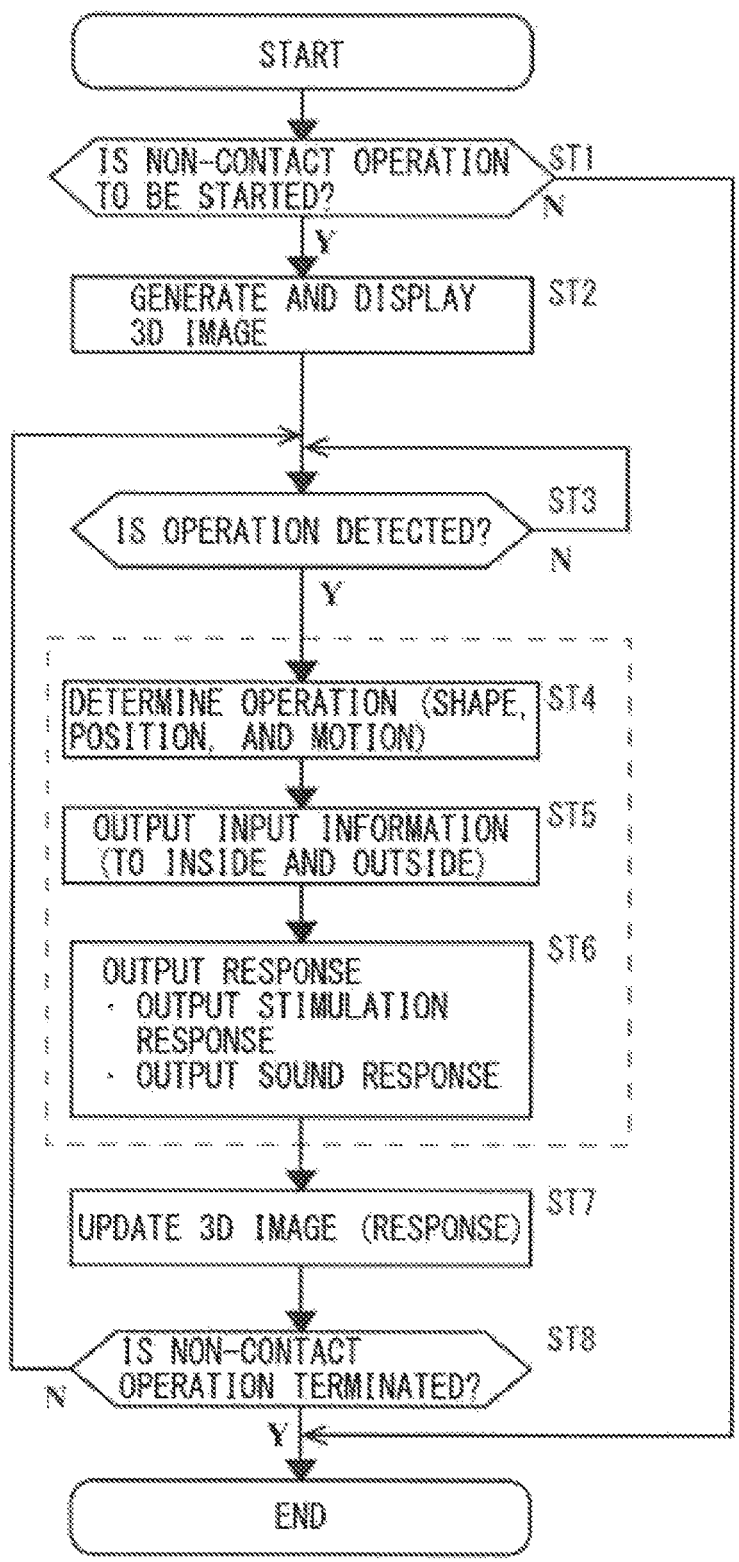
FIG. 5 is a flowchart illustrating an example of a flow of non-contact operation processing executed by the non-contact operating apparatus illustrated in FIG. 3.

FIG. 5 is a flowchart illustrating a flow of non-contact operation processing executed by the non-contact operating apparatus 40 illustrated in FIG. 3.

In Step ST1, the operation ECU 20 may determine whether a non-contact operation against an image object in an image by projecting the image is to be started. For example, in a case where a display instruction is inputted from any ECU or in a case where there is the content to be displayed, the operation ECU 20 may determine that the non-contact operation is to be started (Y in Step ST1), and cause the processing flow to proceed to Step ST2. Otherwise, the operation ECU 20 may determine that the non-contact operation is not to be started (N in Step ST1), and terminate the non-contact operation processing illustrated in FIG. 5.

In Step ST2, the operation ECU 20 generates, as the image generating unit 51, an initial 3D image, and may cause the 3D image projecting device 43 to display the 3D image. First, the operation ECU 20 may generate a three-dimensional model from three-dimensional model data acquired from the memory 47 or the in-vehicle communication unit 41, and further generate image data for projection.

The operation ECU 20 may generate the image data for projection from the three-dimensional model on the basis of settings of an initial projected position and an initial display direction of the image which are set for the three-dimensional model in advance. In one example, the operation ECU 20 may temporarily store the generated three-dimensional model in the memory 47. In this case, the operation ECU 20 may read out the three-dimensional model from the memory 47 in a next generating process directed to updating of the image. This makes it possible to generate the image data for projection. The operation ECU 20 may output the generated image data for projection to the 3D image projecting device 43. The 3D image projecting device 43 projects an image based on the image data for projection in a space within the vehicle compartment 3. Thereby, for example, in a case where the initial projected position is a standard projected position, as illustrated in FIG. 4, the three-dimensional model may be displayed at the standard projected position in front of the occupant in a predetermined display direction. The standard projected position refers to a position at which the image is projected in front of the occupant with the driving posture. In a case, for example, where the three-dimensional model has orientation, the predetermined display direction may be so set that a front surface of the three-dimensional model is directed toward the occupant, for example. The occupant with the driving posture may be allowed to touch the image object by merely stretching his or her hand.

In Step ST3, the operation ECU 20 may determine, as the operation determining unit 52, whether an operation of the occupant against an image object in the image is detected. The operation of the occupant may be acquired from the operation detecting device 44. The operation ECU 20 may acquire detected information such as an image of the stereo camera 63 from the operation detecting device 44, for example, and extract a predetermined operation site of the occupant such as a fingertip of the occupant, for example. The operation ECU 20 may thereafter detect the operation of the occupant against the image object on the basis of variation of a position of the predetermined operation site in the vehicle compartment 3 or presence or absence of motion thereof, for example. In the detection of the operation at this point, the operation ECU 20 may determine that the operation of the occupant against the image object is detected even though the operation site of the occupant does not operate the image object. In a case where the operation of the occupant against the image object is not detected (N in Step ST3), the operation ECU 20 may repeat this determination process in Step ST3. In a case where the operation of the occupant against the image object is detected (Y in Step ST3), the operation ECU 20 may cause the processing flow to proceed to Step ST4.

In Step ST4, the operation ECU 20 may determine, as the operation determining unit 52, the operation of the occupant against the image object. The operation ECU 20 may first determine whether the operation site of the occupant is in a state where the operation site is in contact with the image object, on the basis of a projected position of a surface of the projected image. In a case where it is determined that the operation site is in the state where the operation site is in contact with the image object, the operation ECU 20 may further determine a contact shape, a position and motion (including a direction and a speed) of the operation site. The contact shape may be the number of fingers that are in contact with the image object, or a position of the hand, for example. Moreover, the operation ECU 20 may determine, on the basis of the projected position of the surface of the projected image, a remaining distance to a point where the operation site comes into contact with the image object, or a depth at which the operation site is in contact with the image object, for example.

Further, in a case where it is determined that the operation of the occupant is made against a predetermined image portion, such as a button, of the image object projected in the space within the vehicle compartment 3, on the basis of the operational information determined in this manner, for example, the operation ECU 20 may generate input information inputted by the operation of the occupant.

In Step ST5, the operation ECU 20 may output, as the operation determining unit 52, the determined operational information on the operation of the occupant and the input information inputted by the operation to inside and outside of the operation ECU 20. The operation ECU 20 may output the operational information to the image generating unit 51, the stimulation response output unit 53, and the sound response output unit 54 in the operation ECU 20. Further, the operation ECU 20 may output the input information to each of the control ECUs of the plurality of control devices provided in the respective units of the vehicle 1 through the in-vehicle communication unit 41.

In Step ST6, the operation ECU 20 may output a tactile stimulation, a sound, or both as a response to the operation on the basis of the operational information.

The operation ECU 20 may specify, as the stimulation response output unit 53, a position of the operation site of the occupant in the state of being in contact with the image object, on the basis of the operational information. The operation ECU 20 may thereafter select the plurality of ultrasonic elements 65 that is to output ultrasound waves so that the ultrasound waves are outputted toward the specified position, and output an electrical signal to the stimulation output device 45. The stimulation output device 45 may output the ultrasound waves from the plurality of ultrasonic elements 65 thus selected. The occupant is allowed to obtain, on the basis of the response by the ultrasound waves, a tactile sensation as if the occupant operates the image object.

The operation ECU 20 may select, as the sound response output unit 54, audio data from the memory 47 in accordance with the motion of the operation site of the occupant, which is in a state where the operation site is in contact with the image object specified on the basis of the operational information, and a contact portion between the operation site and the image object. Further, the operation ECU 20 may output a sound signal generated from the audio data to the sound output device 46. The sound output device 46 may output a sound based on the sound signal to the vehicle compartment 3. This makes it possible for the occupant to hear, as a response sound against the operation, a different sound based on the motion of the operation site of the occupant and the contact portion between the operation site and the image object.

In Step ST7, the operation ECU 20 updates, as the image generating unit 51, the image data to be projected for the response to the operation of the occupant, on the basis of the operational information. The operation ECU 20 may read out the three-dimensional model stored in the memory 47 to update the image data for projection, and output the updated image data to the 3D image projecting device 43. The 3D image projecting device 43 projects the updated image to the space within the vehicle compartment 3. This makes it possible for the occupant to visually recognize that the occupant oneself operates the image object by the operation site on the basis of variation in the projected image. The operation ECU 20 may so update the image data to be projected and the output of the stimulation that the image data to be projected and the output of the stimulation are synchronized with each other in accordance with the same operational information on the operation site of the occupant detected by the operation detecting device 44 and determined by the operation determining unit 52.

In Step ST8, the operation ECU 20 may determine whether the non-contact operation is to be terminated. For example, in a case where outputting of the input information based on the operation is completed, in a case where any new display instruction is not inputted, or in a case where the displayed content is to be terminated, the operation ECU 20 may determine that the non-contact operation is to be terminated (Y in Step ST8), and terminate the processing flow illustrated in FIG. 5. Otherwise (N in Step ST8), the operation ECU 20 may cause the processing flow to return to Step ST3. Thereby, the operation ECU 20 may repeat the processes from Step ST3 to Step ST8 until it is determined in Step ST8 that the non-contact operation is to be terminated. During these repeating processes, the operation ECU 20 may appropriately repeat the respective processes of the response by the stimulation to the operation site of the occupant, the response by the sound, and the response by the update of the projected image, in response to the operation of the occupant against the image object. Namely, when the projected image is updated in response to the operation, the operation ECU 20 may so vary the output of the tactile stimulation by the ultrasound field as to correspond to the updated projected image. The tactile stimulation by the ultrasound field may be so controlled synchronously as to follow update of the image.

Figure 6:
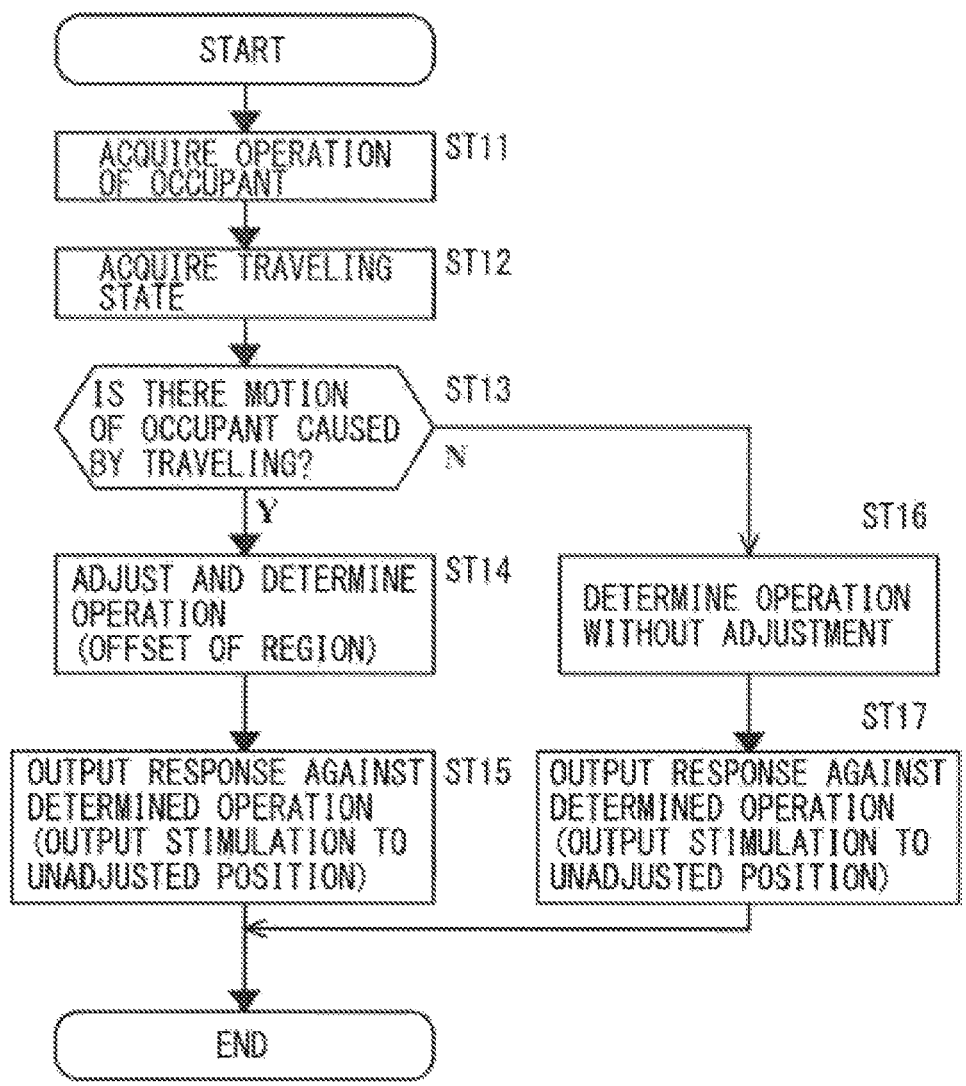
FIG. 6 is a flowchart illustrating an example of flows of an operation determining process and a response outputting process as a determination result according to one example embodiment of the technology.

FIG. 6 is a flowchart illustrating an example of flows of an operation determining process and a response outputting process as a determination result according to the first example embodiment.

The processes illustrated in FIG. 6 may correspond to the processes from Step ST4 to Step ST6, which are surrounded by a dotted square frame in FIG. 5. In FIG. 6, the process to output the input information to the outside in Step ST5 and the sound response outputting process in Step ST6 are omitted.

In Step ST11, the operation ECU 20 may acquire, as the operation determining unit 52, information on an operation of the occupant from the operation detecting device 44 in order to determine the operation.

In Step ST12, the operation ECU 20 may further acquire, as the operation determining unit 52, information on a traveling state from the traveling state detecting device 48 in order to determine the operation.

In Step ST13, the operation ECU 20 may determine, as the operation determining unit 52, whether there is motion such as swing of the occupant caused by traveling of the vehicle 1 on the basis of the information acquired from the traveling state detecting device 48.

For example, in a case where it is determined that the acceleration or weight in the acquired traveling state is a predetermined value or lower, the operation ECU 20 may determine that there is no motion of the occupant caused by traveling of the vehicle 1. In this case, the operation ECU 20 may cause the processing flow to proceed to Step ST16.

In contrast, for example, in a case where it is determined that the acceleration or weight in the acquired traveling state is not the predetermined value or lower, the operation ECU 20 may determine that there is motion of the occupant caused by traveling of the vehicle 1. In this case, the operation ECU 20 may cause the processing flow to proceed to Step ST14.

In a case where it is determined that there is no motion of the occupant caused by the motion of the vehicle 1 (N in Step ST13), in Step ST16, the operation ECU 20 may determine, as the operation determining unit 52, presence or absence of the operation against the image object by the occupant without adjusting operational information on the detected operation of the occupant.

With respect to the operation against the image object by the operation site of the occupant, detected by the operation detecting device 44, the operation ECU 20 may determine whether the operation site of the occupant is in a state where the operation site is in contact with an inputtable region by using the inputtable region. The inputtable region may be set with respect to the image object. In a case where it is determined that the operation site is in the state where the operation site is in contact with the inputtable region, the operation ECU 20 may further determine, as the operation determining unit 52, a contact shape, a position and motion (including a direction and a speed) of the operation site. Further, in a case where it is determined that the occupant operates a predetermined image portion (that is, the image object) such as a button in the image projected in the space within the vehicle compartment 3 on the basis of the operational information, for example, the operation ECU 20 may generate input information based on the operation of the occupant.

In Step ST17, the operation ECU 20 may execute a response output to the operation determined in Step ST16.

In a specific but non-limiting example, the operation ECU 20 may specify, as the stimulation response output unit 53, a tactile stimulation for the operation determined in Step ST16, and instruct the stimulation output device 45 to output the specified tactile stimulation to a position of the operation site used for the determination in Step ST16.

Thus, in a case where it is determined that there is no motion of the occupant caused by the motion of the vehicle 1, the operation ECU 20 may instruct the stimulation output device 45 to output the tactile stimulation to the position of the operation site of the occupant, which is not adjusted, on the basis of a detection result of the traveling state detecting device 48.

In contrast, in a case where it is determined that there is motion of the occupant caused by the motion of the vehicle 1 (Y in Step ST13), in Step ST14, the operation ECU 20 may adjust, as the operation determining unit 52, operational information on the detected operation of the occupant, and determine presence or absence of the operation against the image object by the occupant.

The operation ECU 20 may correct a position of the inputtable region of the image object on the basis of the motion of the occupant caused by the motion of the vehicle 1 detected by the traveling state detecting device 48, thereby adjusting the operational information on the operation against the image object by the occupant. Thereafter, the operation ECU 20 may determine whether the operation site of the occupant operates the inputtable region at the corrected position on the basis of the operational information of the occupant against the image object detected by the operation detecting device 44. This makes it possible to determine presence or absence of the operation that the occupant tries to make against the image object. In a specific but non-limiting example, the operation ECU 20 may determine, as the operation determining unit 52, presence or absence of the operation against the image object by the occupant on the basis of the operation of the occupant after the position of the inputtable region is corrected, thereby determining whether the operation site of the occupant is in the state where the operation site is in contact with the image object. In a case where it is determined that the operation site is in a state of operating the image object, the operation ECU 20 may further determine, as the operation determining unit 52, a contact shape, a position, and motion (including a direction and a speed) of the operation site. Further, in a case where it is determined that the occupant operates the predetermined image portion (that is, the image object) such as the button in the image projected in the space within the vehicle compartment 3 on the basis of the operational information, for example, the operation ECU 20 may generate input information based on the operation of the occupant.

In Step ST15, the operation ECU 20 may execute a response output based on a tactile stimulation against the operation of the occupant determined in Step ST14.

In a specific but non-limiting example, the operation ECU 20 may specify, as the stimulation response output unit 53, a tactile stimulation against the operation determined in Step ST14, and instruct the stimulation output device 45 to output the specified tactile stimulation to the position of the operation site detected by the operation detecting device 44.

Thus, in a case where it is determined that there is motion of the occupant caused by the motion of the vehicle 1, the operation ECU 20 may instruct the stimulation output device 45 not to output the tactile stimulation to the position of the operation site of the occupant adjusted on the basis of the detection result of the traveling state detecting device 48, but to output the tactile stimulation to the operation site of the occupant actually detected by the operation detecting device 44.

In the operation determination in Step ST14, in a case where presence or absence of the operation against the image object by the occupant is determined after the operational information is adjusted on the basis of the detection result of the traveling state detecting device 48, the operation ECU 20 may instruct the stimulation output device 45 to output the tactile stimulation against the operation of the occupant to a wider range compared with a case where the motion is determined without adjusting the operational information on the basis of the detection result of the traveling state detecting device 48 as in Step ST16.

Figure 7:
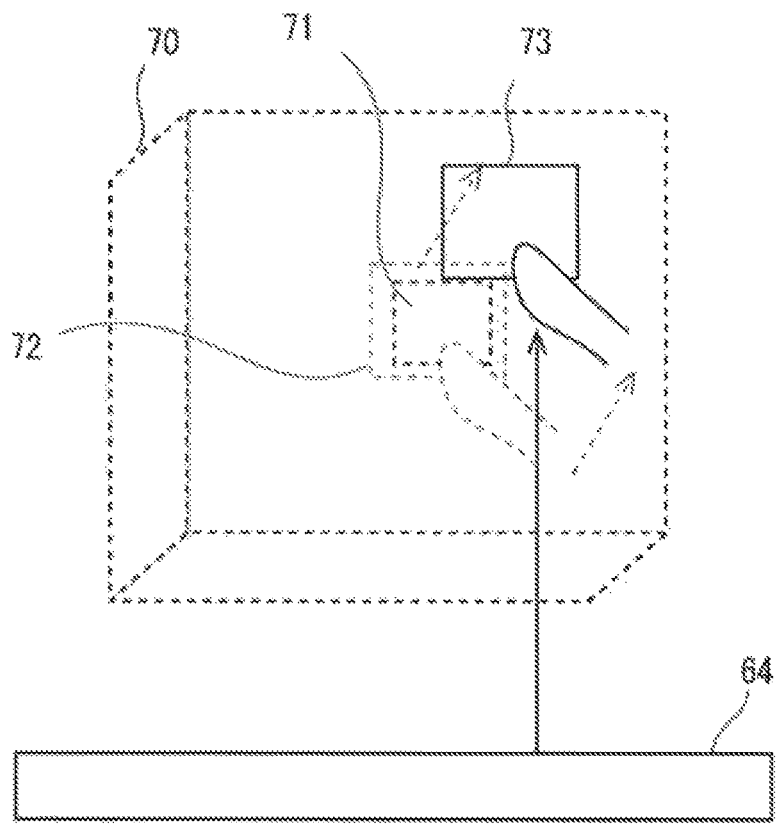
FIG. 7 is an explanatory diagram illustrating an example of the operation determining process and the response outputting process by a tactile stimulation illustrated in FIG. 6.

FIG. 7 is an explanatory diagram illustrating an example of the operation determining process and the response outputting process by a tactile stimulation illustrated in FIG. 6.

In FIG. 7, the unillustrated 3D image projecting device 43 may project an image of a cube 70 as the image object in front of the occupant. The cube 70 may have a button 71 on a certain operation face.

The operation ECU 20 may set, as the operation determining unit 52, an inputtable region 72 at a position of the projected button 71. The inputtable region 72 is illustrated by a broken line in FIG. 7. A size of the inputtable region 72 may be larger than that of the button 71. The operation ECU 20 may determine, as the operation determining unit 52, presence or absence of an operation against this inputtable region 72 by the occupant. The operation ECU 20 may determine, as the operation determining unit 52, that the button 71 is operated in a case where a fingertip of the occupant so moves as to come into contact with the inputtable region 72, for example.

Further, in a case where it is determined that there is motion of the occupant caused by motion of the vehicle 1, the operation ECU 20 may cause the inputtable region 72 to move from an initial position at which the inputtable region 72 overlaps the button 71 to an offset position based on the motion of the occupant. An offset direction from the initial position of the inputtable region 72 may be the same or approximately the same direction as the motion of the occupant caused by the motion of the vehicle 1 detected by the traveling state detecting device 48. An offset amount from the initial position of the inputtable region 72 may be the same or approximately the same amount as an amount of the motion of the occupant caused by the motion of the vehicle 1 detected by the traveling state detecting device 48.

In the example illustrated in FIG. 7, a finger by which the occupant tries to operate the button 71 may be shifted in an upper right direction in FIG. 7 due to the motion of the vehicle 1 to touch the image object. In this case, the operation ECU 20 may cause the inputtable region 72 to move from the initial position to the offset position in the upper right direction, and determine presence or absence of the operation against the button 71 by the occupant on the basis of a position of an inputtable region 73 after movement. Thereby, the operation ECU 20 can accurately determine the operation against the button 71 by the occupant on the basis of the position of the inputtable region 73 so as to cancel the motion of the occupant caused by the motion of the vehicle 1. It is to be noted that, in a case where an acceleration in a lateral direction acts on the vehicle 1, the offset direction may be a lateral direction of the vehicle body 2. Further, in a case where an acceleration in a front-back direction acts on the vehicle 1, the offset direction may be a front-back direction of the vehicle body 2. Further, the offset amount may be proportional to the amount of the motion of the occupant caused by the motion of the vehicle 1. The offset amount may be set to about a several millimeters in a case of the maximum acceleration that is assumed to be capable of acting on the occupant while normal traveling of the vehicle 1.

As explained above, in the first example embodiment, the operation determining unit 52 may determine whether there is motion of the vehicle 1 or overall motion of the occupant caused by the motion of the vehicle 1 on the basis of the information acquired from the traveling state detecting device 48 as a motion detecting device. Thereafter, the operation determining unit 52 may so adjust the operational information of the occupant as to suppress the motion of the occupant caused by the motion of the vehicle 1, on the basis of the detection result of the traveling state detecting device 48, and determine presence or absence of the operation against the image object projected in midair within the vehicle compartment 3 by the operation site of the occupant based on the detection result of the operation detecting device 44.

This makes it possible to appropriately determine a non-contact operation that the occupant tries to perform against the image object in the first place regardless of the motion of the vehicle 1 while traveling. Namely, according to the first example embodiment, it is possible to accurately determine the operation of the occupant even in a state where a body of the occupant is moved by behavior of the vehicle 1.

Second Example Embodiment

Next, the non-contact operating apparatus 40 for the vehicle 1 according to a second example embodiment of the technology will be described. In the second example embodiment, elements corresponding to those in the first example embodiment described above are denoted with the same numerals as those in the first example embodiment to avoid any redundant description.

Figure 8:
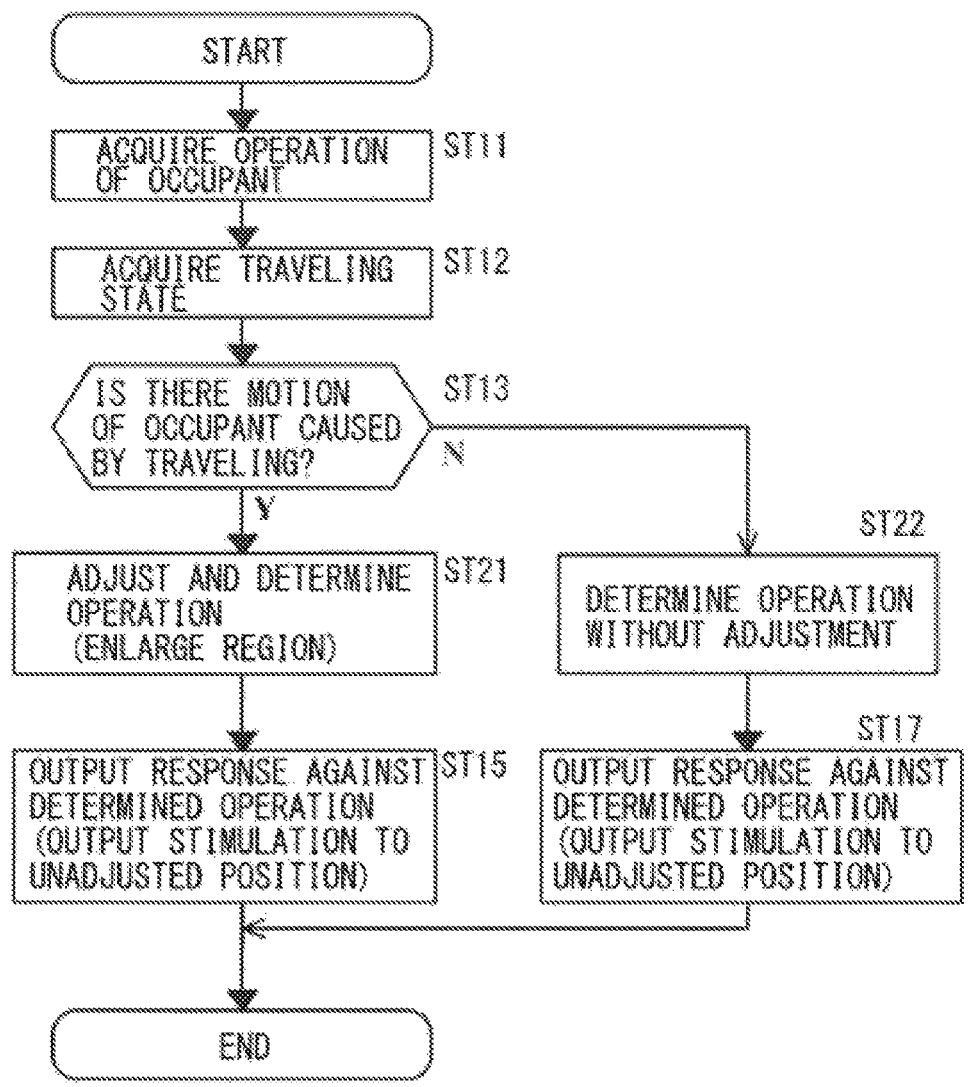
FIG. 8 is a flowchart illustrating an example of flows of an operation determining process and a response outputting process as a determination result according to one example embodiment of the technology.

FIG. 8 is a flowchart illustrating an example of flows of an operation determining process and a response outputting process as a determination result according to the second example embodiment.

In a case where it is determined that there is motion of an occupant caused by traveling of the vehicle 1 (Y in Step ST13), in Step ST21, the operation ECU 20 may adjust, as the operation determining unit 52, detected operational information of the occupant, and determine presence or absence of an operation against an image object by the occupant.

Similarly to Step ST22 in which there is no motion of the occupant caused by traveling of the vehicle 1, the operation ECU 20 may use the inputtable region set for the projected image object, and determine, as the operation determining unit 52, whether an operation site of the occupant is in a state where the operation site is in contact with the inputtable region. It is to be noted that the process in Step ST22 is similar to the process in Step ST16. In Step ST21, in particular, the operation ECU 20 may correct a range of the inputtable region of the image object on the basis of motion of the occupant caused by motion of the vehicle 1 detected by the traveling state detecting device 48, and adjust information on the motion of the occupant. Further, the operation ECU 20 may so adjust the inputtable region as to enlarge the inputtable region in accordance with a magnitude of the motion of the occupant caused by the motion of the vehicle 1.

Thereafter, the operation ECU 20 may determine whether the occupant perform an operation against the inputtable region whose range is enlarged, on the basis of the operation of the occupant detected by the operation detecting device 44. This makes it possible to accurately determine the operation that the occupant tries to perform against the image object. The operation ECU 20 may determine presence or absence of the operation by the occupant against the inputtable region whose range is enlarged, thereby determining whether the operation site of the occupant is in a state where the operation site is in contact with the image object. Thereafter, in a case where it is determined that the operation site is in a state where the operation site operates the image object, the operation ECU 20 may further determine a contact shape, a position, and motion (including a direction and a speed) of the operation site. Further, in a case where it is determined that the occupant performs an operation against a predetermined image portion such as the button 71 in an image projected in a space within the vehicle compartment 3 on the basis of the operational information, for example, the operation ECU 20 may generate input information on the operation of the occupant.

Thereafter, in Step ST15, the operation ECU 20 may execute a response output based on a tactile stimulation against the operation of the occupant determined in Step ST21. Here, there is motion of the occupant caused by the motion of the vehicle 1. Thereafter, the operation ECU 20 may instruct the stimulation output device 45 not to output the tactile stimulation to the position of the operation site of the occupant adjusted on the basis of a detection result of the traveling state detecting device 48, but to output the tactile stimulation to the operation site of the occupant actually detected by the operation detecting device 44.

In a case where the operational information of the occupant is adjusted on the basis of the detection result of the traveling state detecting device 48 and presence or absence of the operation against the image object by the occupant is determined in Step ST21, the operation ECU 20 may instruct the stimulation output device 45 to output a tactile stimulation in response to the operation of the occupant to a wider range compared with a case where presence or absence of the operation is determined without adjusting the operational information on the basis of the detection result of the traveling state detecting device 48 as in Step ST22.

Figure 9:
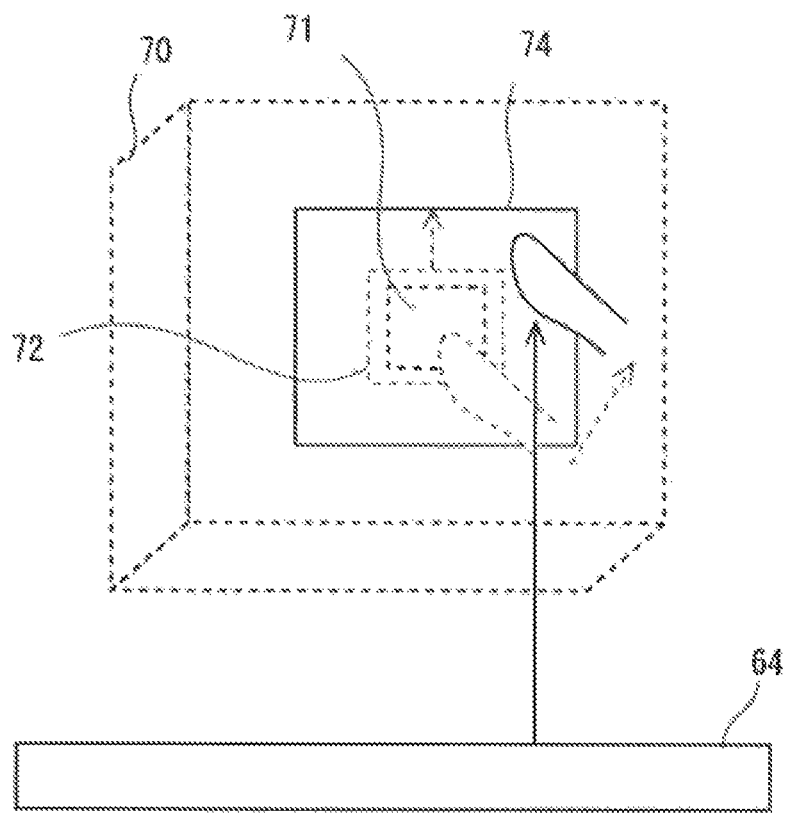
FIG. 9 is an explanatory diagram illustrating an example of the operation determining process and the response outputting process by a tactile stimulation illustrated in FIG. 8.

FIG. 9 is an explanatory diagram illustrating an example of the operation determining process and the response outputting process by a tactile stimulation illustrated in FIG. 8.

In FIG. 9, the unillustrated 3D image projecting device 43 may projects an image of the cube 70 as the image object in front of the occupant. The cube 70 may have the button 71 on a certain operation face.

The operation ECU 20 may set, as the operation determining unit 52, the inputtable region 72 at a position of the projected button 71. The inputtable region 72 is illustrated by a broken line in FIG. 9. The operation ECU 20 may determine, as the operation determining unit 52, presence or absence of an operation against this inputtable region 72 by the occupant. For example, when a fingertip of the occupant so moves as to come into contact with the inputtable region 72, the operation ECU 20 may determine, as the operation determining unit 52, that a finger of the occupant operates the button 71.

Thereafter, in a case where it is determined that there is motion of the occupant caused by motion of the vehicle 1, the operation ECU 20 may enlarge the inputtable region 72 from an initial size. An enlargement ratio of the inputtable region 72 from the initial size may be a rate corresponding to an amount of the motion of the occupant caused by the motion of the vehicle 1 detected by the traveling state detecting device 48. Further, in FIG. 9, the inputtable region 72 may be enlarged in all of upper, lower, right, and left directions. Otherwise, for example, the inputtable region 72 may be enlarged only in the same direction as that of the motion of the occupant caused by the motion of the vehicle 1 detected by the traveling state detecting device 48. For example, in a case where the occupant moves only in a vertical direction, the operation ECU 20 may enlarge the inputtable region 72 only in the upper-lower direction.

In the example illustrated in FIG. 9, the finger by which the occupant tries to operate the button 71 may be in contact with a portion in an upper right direction of the inputtable region 72 illustrated in FIG. 9 due to the motion of the vehicle 1. In this case, the operation ECU 20 may enlarge the inputtable region 72 from the initial size, and determine presence or absence of the operation against the button 71 by the occupant on the basis of an inputtable region 74 after enlargement.

Thereby, the operation ECU 20 can determine presence or absence of the operation against the button 71 by the occupant on the basis of the inputtable region 74 by suppressing an influence of the motion of the occupant caused by the motion of the vehicle 1.

As explained above, in the second example embodiment, the operation determining unit 52 may determine whether there is motion of the vehicle 1 or overall motion of the occupant caused by the motion of the vehicle 1, on the basis of the information acquired from the traveling state detecting device 48 as a motion detecting device. Further, the operation determining unit 52 may so adjust the operational information of the occupant as to suppress the motion of the occupant caused by the motion of the vehicle 1, on the basis of the detection result of the traveling state detecting device 48, and determine presence or absence of the operation against the image object projected in midair within the vehicle compartment 3 by the operation site of the occupant based on the detection result of the operation detecting device 44.

This makes it possible to appropriately determine a non-contact operation that the occupant tries to perform against the image object in the first place regardless of the motion of the vehicle 1 while traveling. Namely, according to the second example embodiment, it is also possible to accurately determine the operation of the occupant even in a state where a body of the occupant is moved by behavior of the vehicle 1.

Third Example Embodiment

Next, the non-contact operating apparatus 40 for the vehicle 1 according to a third example embodiment of the technology will be described. In the third example embodiment, elements corresponding to those in the first or second example embodiment described above are denoted with the same numerals as those in the first or second example embodiment to avoid any redundant description.

In the third example embodiment, the operation detecting device 44 or the traveling state detecting device 48 may detect the overall motion of an occupant caused by motion of the vehicle 1 while traveling by capturing an image of the occupant.

Figure 10:
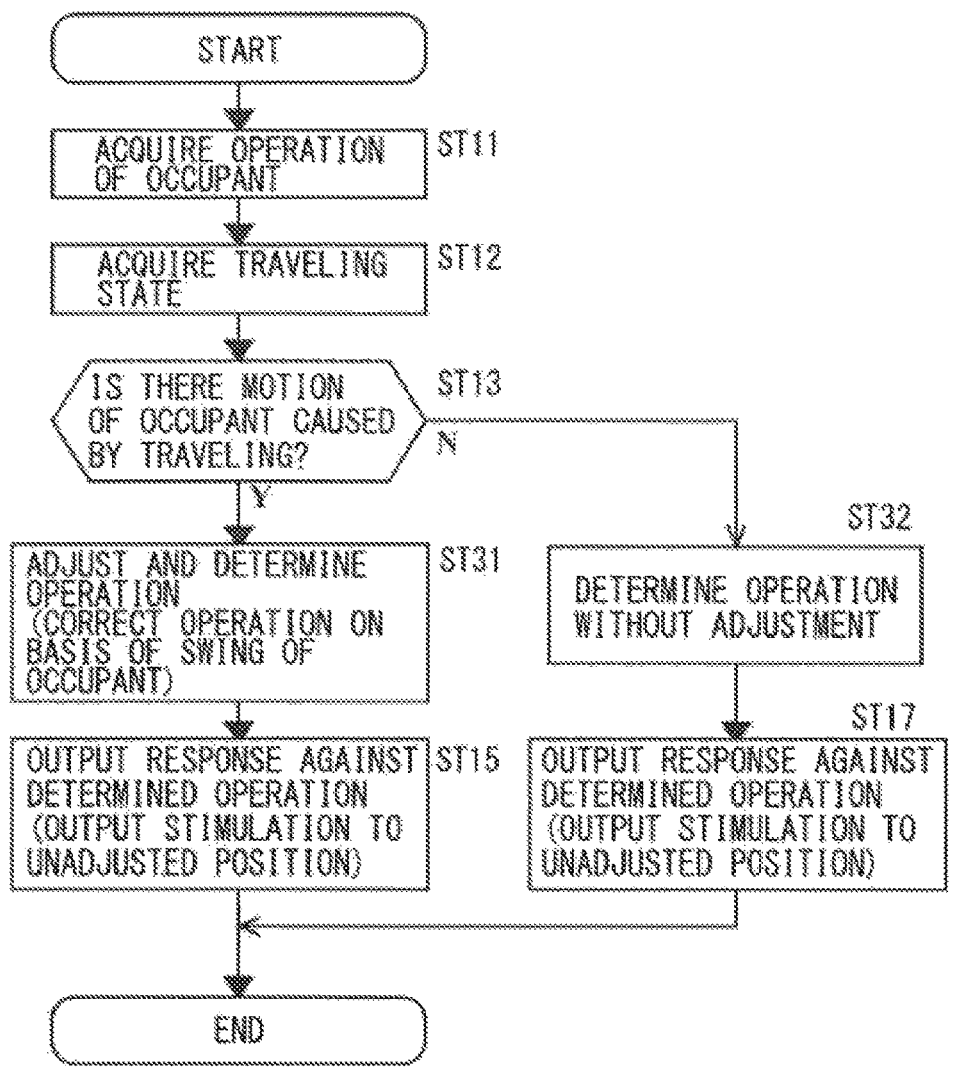
FIG. 10 is a flowchart illustrating an example of flows of an operation determining process and a response outputting process as a determination result according to one example embodiment of the technology.

FIG. 10 is a flowchart illustrating an example of flows of an operation determining process and a response outputting process as a determination result according to the third example embodiment.

In a case where it is determined that there is motion of the occupant caused by traveling of the vehicle 1 in Step ST13 (Y in Step ST13), in Step ST31, the operation ECU 20 may adjust, as the operation determining unit 52, detected operational information on the occupant, and determine presence or absence of an operation against an image object by the occupant.

Similarly to Step ST32 in which there is no motion of the occupant caused by traveling of the vehicle 1, the operation ECU 20 may determine, as the operation determining unit 52, presence or absence of the operation by the occupant, on the basis of motion of an operation site of the occupant against the projected image object. It is to be noted that the process in Step ST32 may be similar to the process in Step ST16. In Step ST31, in particular, the operation ECU 20 may so correct and adjust the operational information of the occupant against an inputtable region of the image object detected by the operation detecting device 44 as to cancel the motion of the occupant caused by the motion of the vehicle 1 detected by the traveling state detecting device 48. This makes it possible to accurately specify the operation that the occupant tries to perform against the image object. The operation ECU 20 may determine presence or absence of the operation against the image object by the occupant on the basis of the adjusted operational information, thereby determining whether the operation site of the occupant is in a state where the operation site is in contact with the image object. Thereafter, in a case where it is determined that the operation site is in a state where the operation site operates the image object, the operation ECU 20 may further determine a contact shape, a position, and motion (including a direction and a speed) of the operation site. Further, in a case where it is determined that the occupant performs an operation against a predetermined image portion such as the button 71 (see FIG. 9) in the image projected in a space within the vehicle compartment 3 on the basis of the operational information, for example, the operation ECU 20 may generate input information on the operation of the occupant.

Thereafter, in Step ST15, the operation ECU 20 may execute a response output based on a tactile stimulation against the operation of the occupant determined in Step ST31. Here, there is motion of the occupant caused by the motion of the vehicle 1. Therefore, the operation ECU 20 may instruct the stimulation output device 45 not to output the tactile stimulation to the position of the operation site of the occupant adjusted on the basis of a detection result of the traveling state detecting device 48, but to output the tactile stimulation to the operation site of the occupant actually detected by the operation detecting device 44.

In a case where the operational information of the occupant is adjusted on the basis of the detection result of the traveling state detecting device 48 and presence or absence of the operation against the image object by the occupant is determined in Step ST31, the operation ECU 20 may instruct the stimulation output device 45 to output a tactile stimulation in response to the operation of the occupant to a wider range compared with a case where presence or absence of the operation is determined without adjusting the operational information on the basis of the detection result of the traveling state detecting device 48 as in Step ST32.

Figure 11:
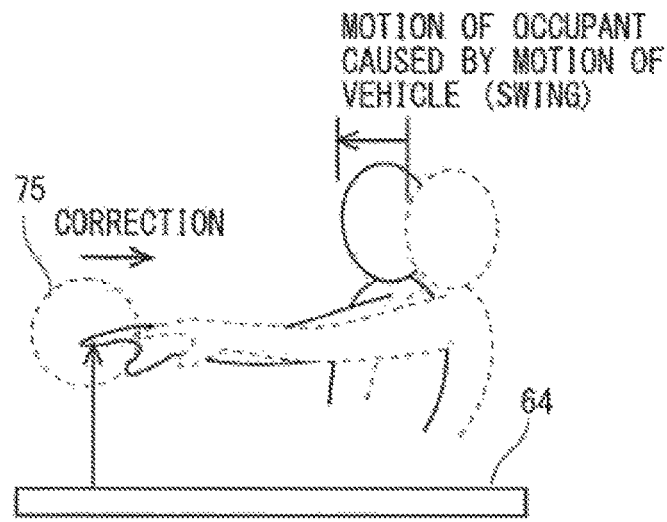
FIG. 11 is an explanatory diagram illustrating an example of the operation determining process and the response outputting process by a tactile stimulation illustrated in FIG. 10.

FIG. 11 is an explanatory diagram illustrating an example of the operation determining process and the response outputting process by a tactile stimulation illustrated in FIG. 10.

In FIG. 11, the unillustrated 3D image projecting device 43 may project an image of a sphere 75 as the image object in front of the occupant.

The operation ECU 20 may determine, as the operation determining unit 52, presence or absence of an operation against the projected sphere 75 by the occupant. For example, when a fingertip of the occupant so moves as to come into contact with a surface of the sphere 75, the operation ECU 20 may determine, as the operation determining unit 52, that the fingertip of the occupant operates the sphere 75.

In a case where it is determined that there is motion of the occupant caused by the motion of the vehicle 1, the operation ECU 20 may so correct and adjust positional information of the fingertip or the operational information of the occupant who operates the sphere 75 as the image object as to cancel the motion of the occupant caused by the motion of the vehicle 1.

For example, in the third example embodiment, the operation ECU 20 may calculate a moving direction and a movement amount of a head of the occupant caused by the motion of the vehicle 1 on the basis of a difference in a capturing position of the operation site with respect to the image object before and after the operation of the occupant. Further, the operation ECU 20 may correct a position of the fingertip of the occupant in an opposite direction to the moving direction of the head by the movement amount of the head.

In the example illustrated in FIG. 11, the head of the occupant so moves as to be swung in a left direction of FIG. 11, which is a front direction of the vehicle 1, due to the motion of the vehicle 1. In this case, the operation ECU 20 may correct the position of the fingertip of the occupant who tries to operate the sphere 75 as the image object in a right direction of FIG. 11, which is a back direction of the vehicle 1, by the movement amount of the head. The operation ECU 20 may determine presence or absence of the operation against the image object on the basis of the adjusted position of the fingertip.

As explained above, in the third example embodiment, the operation determining unit 52 may determine the motion of the vehicle 1 or the overall motion of the occupant caused by the motion of the vehicle 1. Further, the operation determining unit 52 may so adjust the operational information of the occupant as to suppress the motion of the occupant caused by the motion of the vehicle 1, on the basis of the detection result (for example, the head of the occupant) of the operation detecting device 44, and determine presence or absence of the operation against the image object projected in midair within the vehicle compartment 3 by the operation site of the occupant based on the detection result of the operation detecting device 44.

This makes it possible to appropriately determine a non-contact operation that the occupant tries to perform against the image object in the first place regardless of the motion of the vehicle 1 while traveling. Namely, according to the third example embodiment, it is also possible to accurately determine the operation of the occupant even in a state where a body of the occupant is moved by behavior of the vehicle 1.

The specific example embodiments have been described above; however, the described example embodiments are merely examples, and do not limit the scope of the technology. Various kinds of modifications or variations can be made without departing from the scope of the technology.

In one example embodiment, the image generating unit 51 may serve as a "generating unit." In one example embodiment, the vehicle 1 may serve as a "vehicle." In one example embodiment, the 3D image projecting device 43 may serve as a "projecting device." In one embodiment, the operation detecting device 44 may serve as an "operation detecting device." In one example embodiment, the operation determining unit 52 may serve as an "operation determining unit." In one example embodiment, the operation detecting device 44 or the traveling state detecting device 48 may serve as a "motion detecting device."

Each of the drive ECU 11, the steering ECU 12, the brake ECU 13, the automatic driving/driving assist ECU 14, the driving operation ECU 15, the detection ECU 16, the air-conditioning ECU 17, the occupant monitoring ECU 18, the external communication ECU 19, the operation ECU 20, the system ECU 21, and the non-contact operating apparatus 40 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the ECUs 11 to 21 and the non-contact operating apparatus 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the ECUs 11 to 21 and the non-contact operating apparatus 40 illustrated in FIG. 2.

Although one example embodiment of the technology has been described in the foregoing by way of example with reference to the accompanying drawings, the technology is by no means limited to the example embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A non-contact operating apparatus for a vehicle, the non-contact operating apparatus comprising:
   a generating unit configured to generate and update an image containing an image object,
   a projecting device configured to project the image in a predetermined display region within a vehicle compartment of the vehicle, the image object being projected at a predetermined position within the predetermined display region and being visible by an occupant present within the vehicle compartment of the vehicle;
   an operation detecting device configured to detect an operation site of the occupant positioned in a vicinity of the predetermined display region within the vehicle compartment;
   an operation determining unit configured to set an inputtable region that is invisible by the occupant within the predetermined display region, and determine, on a basis of a position or motion of the operation site of the occupant with respect to the inputtable region, whether the operation site of the occupant detected by the operation detecting device performs a non-contact operation against the image object,
   a motion detecting device configured to detect motion of the occupant caused by the motion of the vehicle based on motion at least one of an upper body, a shoulder or a head of the occupant; and
   a traveling state detecting device configured to detect weight acting on the vehicle or an acceleration of the vehicle,
   wherein when the weight is equal to or lower than a first predetermined value or the acceleration is equal to or lower than a second predetermined value, the operation determining unit is configured to i) set a position of the inputtable region at an initial position where the inputtable region overlaps with the image object, and ii) determine presence or absence of the operation against the image object by the operation site of the occupant, wherein when the weight is higher than the first predetermined value or the acceleration is higher than the second predetermined value, the operation determining unit is configured to i) move the position of the inputtable region from the initial position based on the detected motion of the occupant caused by the motion of the vehicle in response to receiving motion data from the motion detecting device indicative of the motion of the occupant caused by the motion of the vehicle, to suppress the motion of the occupant caused by the motion of the vehicle, and ii) determine presence or absence of the operation against the image object by the operation site of the occupant after the position of the inputtable region is moved, wherein the generating unit is configured to generate the image so that a position of the image object is fixed at the predetermined position, even though the position of the inputtable region is moved by the operation determining unit.

2. The non-contact operating apparatus for a vehicle according to claim 1, further comprising:
a stimulation output device configured to output a tactile stimulation based on an ultrasound field to the operation site of the occupant; and
a stimulation response output unit configured to cause the stimulation output device to output, on a basis of a determination result of the operation determining unit, the tactile stimulation as a response to the operation, to the operation site of the occupant performing the non-contact operation against the image object, wherein
even in a case where the operation determining unit moves the position of the inputtable region on the basis of the detection result of the motion detecting device and determines the presence or the absence of the operation by the operation site of the occupant, the stimulation response output unit is configured to cause the stimulation output device to output the tactile stimulation to the position of the operation site of the occupant detected by the operation detecting device.

3. The non-contact operating apparatus for a vehicle according to claim 1, wherein the operation determining unit is configured to move, on the basis of the detection result of the motion detecting device, the position of the inputtable region to suppress the motion of the occupant caused by the motion of the vehicle when the weight is higher than the first predetermined value or the acceleration is higher than the second predetermined value.

4. The non-contact operating apparatus for a vehicle according to claim 2, wherein the operation determining unit is configured to move, on the basis of the detection result of the motion detecting device, the position of the inputtable region to suppress the motion of the occupant caused by the motion of the vehicle when the weight is higher than the first predetermined value or the acceleration is higher than the second predetermined value.

5. The non-contact operating apparatus for a vehicle according to claim 1, wherein
the operation determining unit is configured to
determine the presence or the absence of the operation by the occupant on a basis of motion of the occupant against the image object projected by the projecting device, and
adjust, on the basis of the detection result of the motion detecting device, the detection result of the operation detecting device to suppress the motion of the occupant caused by the motion of the vehicle, and determine the presence or the absence of the operation by the operation site of the occupant.

6. The non-contact operating apparatus for a vehicle according to claim 2, wherein
the operation determining unit is configured to
determine the presence or the absence of the operation by the occupant on a basis of motion of the occupant against the image object projected by the projecting device, and
adjust, on the basis of the detection result of the motion detecting device, the detection result of the operation detecting device to suppress the motion of the occupant caused by the motion of the vehicle, and determine the presence or the absence of the operation by the operation site of the occupant.

7. The non-contact operating apparatus for a vehicle according to claim 1, wherein the motion detecting device is configured to detect, on a basis of an image in which the occupant is captured, the motion of the occupant caused by the motion of the vehicle.

8. The non-contact operating apparatus for a vehicle according to claim 2, wherein the motion detecting device is configured to detect, on a basis of an image in which the occupant is captured, the motion of the occupant caused by the motion of the vehicle.

9. The non-contact operating apparatus for a vehicle according to claim 3, wherein the motion detecting device is configured to detect, on a basis of an image in which the occupant is captured, the motion of the occupant caused by the motion of the vehicle.

10. The non-contact operating apparatus for a vehicle according to claim 4, wherein the motion detecting device is configured to detect, on a basis of an image in which the occupant is captured, the motion of the occupant caused by the motion of the vehicle.

11. A vehicle, comprising:
the non-contact operating apparatus according to claim 1; and
two or more control devices coupled to the non-contact operating apparatus through an internal network, each of the two or more control devices being configured to control an operation of the vehicle,
each of the two or more control devices being configured to acquire input information from the non-contact operating apparatus through the internal network, the input information being generated on a basis of the non-contact operation of the occupant against the image object in the image, the image being projected within the vehicle compartment by the non-contact operating apparatus.

12. A non-contact operating apparatus for a vehicle, comprising:
circuitry configured to control an operation of the non-contact operating apparatus;
a projecting device configured to project an image containing an image object in a predetermined display region within a vehicle compartment of the vehicle, the image object being visible by an occupant present within the vehicle compartment of the vehicle;
an operation detecting device configured to detect an operation site of the occupant positioned in a vicinity of the predetermined display region within the vehicle compartment;
a motion detecting device configured to detect motion of the occupant caused by the motion of the vehicle based on motion at least one of an upper body, a shoulder or a head of the occupant; and a traveling state detecting device configured to detect weight acting on the vehicle or an acceleration of the vehicle, wherein the circuitry being configured to generate and update the image so that a position of the image object is fixed at a predetermined position within the predetermined display region, set an inputtable region that is invisible by the occupant within the predetermined display region, determine, on a basis of a position or motion of the operation site of the occupant with respect to the inputtable region, whether the operation site of the occupant detected by the operation detecting device performs a non-contact operation against the image object, when the weight is equal to or lower than a first predetermined value or the acceleration is equal to or lower than a second predetermined value, i) set a position of the inputtable region at an initial position where the inputtable region overlaps with the image object, and ii) determine presence or absence of the operation against the image object by the operation site of the occupant, and when the weight is higher than the first predetermined value or the acceleration is higher than the second predetermined value, i) move the position of the inputtable region from the initial position based on the detected motion of the occupant caused by the motion of the vehicle in response to receiving motion data from the motion detecting device indicative of the motion of the occupant caused by the motion of the vehicle, to suppress the motion of the occupant caused by the motion of the vehicle, ii) determine presence or absence of the operation against the image object by the operation site of the occupant after the position of the inputtable region is moved.

13. The non-contact operating apparatus for a vehicle according to claim 1, wherein the motion detecting device is configured to detect an acceleration in a front-back direction of the vehicle, wherein the operation determining unit is configured to move the position of the inputtable region along the front-back direction of the vehicle based on the detected acceleration in the front-back direction of the vehicle when the weight is higher than the first predetermined value or the acceleration is higher than the second predetermined value.

* * * * *